(12) United States Patent
Clooten et al.

(10) Patent No.: US 10,607,175 B2
(45) Date of Patent: Mar. 31, 2020

(54) AUTOMATICALLY ANALYZING COMPLEXITY OR SIMPLICITY AND PERFORMING AN ACTION BASED ON THE COMPLEXITY OR THE SIMPLICITY

(71) Applicant: Accenture Global Solutions Limited, Dublin (IE)

(72) Inventors: Alana Clooten, Smryna, GA (US); Hundley M. Elliotte, Atlanta, GA (US); Ariel M. Oken, Atlanta, GA (US); Melissa F. McCoy, Dunwoody, GA (US); Jason W. Holmes, Atlanta, GA (US)

(73) Assignee: Accenture Global Solutions Limited, Dublin (IE)

( * ) Notice: Subject to any disclaimer, the term of this patent is extended or adjusted under 35 U.S.C. 154(b) by 664 days.

(21) Appl. No.: 15/347,453

(22) Filed: Nov. 9, 2016

(65) Prior Publication Data

US 2018/0129990 A1 May 10, 2018

(51) Int. Cl.
*G06Q 10/06* (2012.01)
*G06Q 10/10* (2012.01)

(52) U.S. Cl.
CPC .............................. *G06Q 10/0637* (2013.01)

(58) Field of Classification Search
CPC .............................. G06Q 10/06; G06Q 10/10
USPC ....................................................... 705/7.36
See application file for complete search history.

(56) References Cited

U.S. PATENT DOCUMENTS

| | | | |
|---|---|---|---|
| 10,242,380 B2* | 3/2019 | Hamedi | G06F 16/24578 |
| 2005/0203834 A1* | 9/2005 | Prieston | G06Q 20/10 705/38 |
| 2011/0060617 A1* | 3/2011 | Clark | G06Q 10/06 705/7.37 |

* cited by examiner

*Primary Examiner* — Nga B Nguyen
(74) *Attorney, Agent, or Firm* — Harrity & Harrity, LLP

(57) ABSTRACT

A device may receive a plurality of data items related to an entity to be analyzed. The device may store the plurality of data items using a storage device based on receiving the plurality of data items. The device may analyze the plurality of data items to identify complexity factors related to the entity based on storing the plurality of data items. The complexity factors may positively impact the entity or negatively impact the entity. The device may generate a set of action items associated with modifying operations of the entity to impact the complexity factors related to the entity. The set of action items may be associated with positively impacting the entity. The device may perform a set of actions based on the set of action items to positively impact the entity.

20 Claims, 14 Drawing Sheets

100

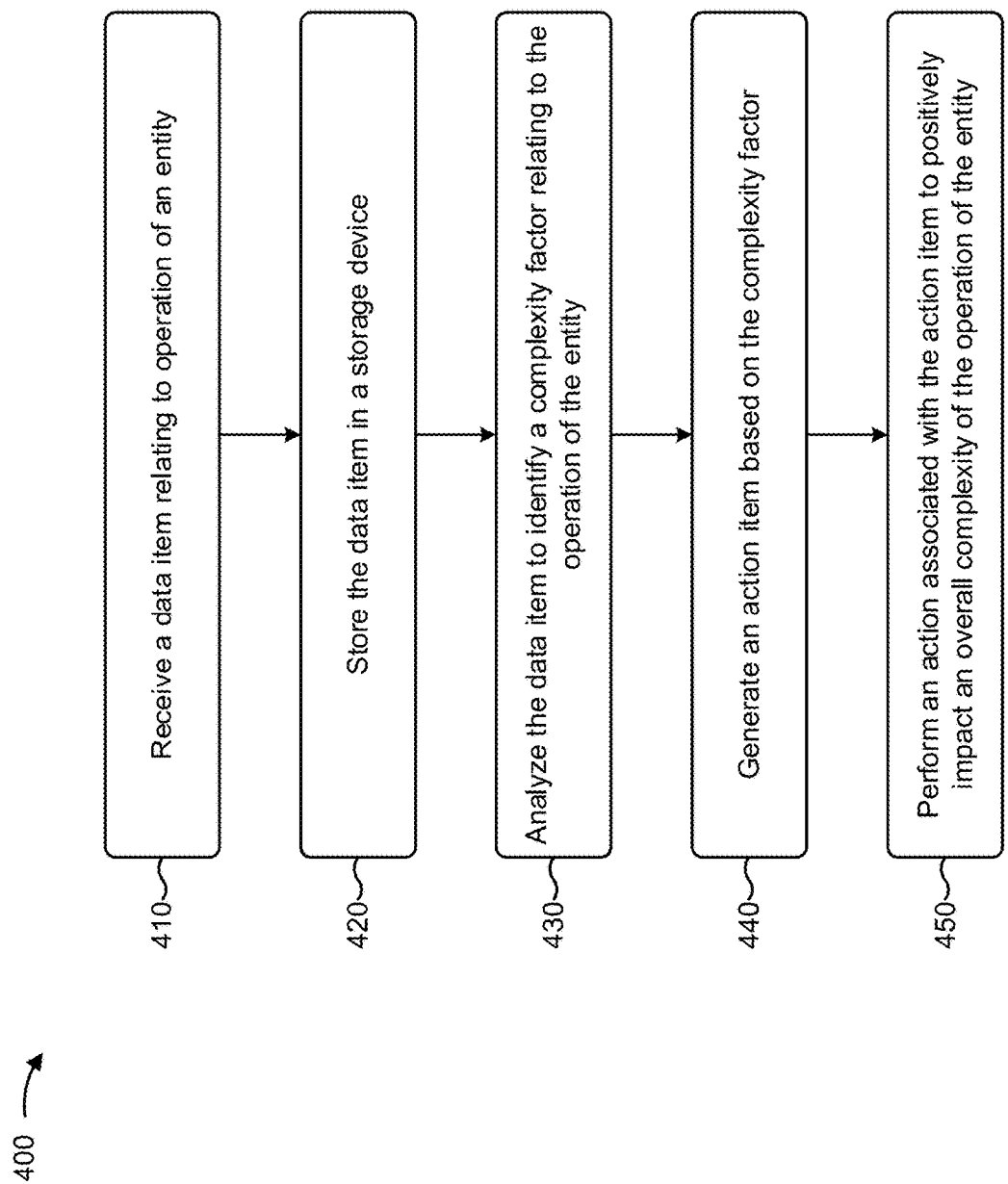

AUTOMATICALLY ANALYZING COMPLEXITY OR SIMPLICITY AND PERFORMING AN ACTION BASED ON THE COMPLEXITY OR THE SIMPLICITY

BACKGROUND

A process may include a set of interrelated activities that interact to achieve a result. For example, a process may relate to the purchase and/or consumption of a good or service provided by an entity. A result of the process may be affected by a structure and/or organization of the process. For example, a process to purchase a good may include individual interaction with a web-based e-commerce system or a retail store front. In this example, data, related to the interactions of the individual with the e-commerce system or retail store front, may be collected.

SUMMARY

According to some possible implementations, a device may include one or more processors to obtain, by a computing device of a cloud computing environment, a plurality of data items relating to operation of an entity. The one or more processors may store, by the computing device of the cloud computing environment, the plurality of data items in one or more storage devices associated with the cloud computing environment. The one or more processors may determine, by the computing device of the cloud computing environment, whether the plurality of data items can be mapped using an identifier associated with the plurality of data items based on obtaining the plurality of data items. The one or more processors may analyze, by the computing device of the cloud computing environment and after storing the plurality of data items, the plurality of data items to identify a plurality of complexity factors relating to the operation of the entity. The plurality of complexity factors may include at least one item of negative complexity that negatively impacts the operation of the entity, and at least one item of positive complexity that positively impacts the operation of the entity.

The one or more processors may generate, by the computing device of the cloud computing environment, a plurality of action items based on the plurality of complexity factors. The plurality of action items may positively impact an overall complexity of the operation of the entity. The plurality of action items may include at least one action item associated with the at least one item of negative complexity to reduce an impact of the at least one item of negative complexity. The one or more processors may perform, by the computing device of the cloud computing environment, an action associated with one or more of the plurality of action items to positively impact the overall complexity of the operation of the entity.

According to some possible implementations, a non-transitory computer-readable medium may store one or more instructions that, when executed by one or more processors of an analytics system, cause the one or more processors to receive, from another device, multiple data items related to an entity. The one or more instructions may cause the one or more processors to store the multiple data items in a storage device associated with the analytics system based on receiving the multiple data items. The one or more instructions may cause the one or more processors to analyze the multiple data items to identify one or more complexity factors related to the entity in association with storing the multiple data items. The one or more complexity factors may include one or more negative complexity factors that decrease a value of the entity, and one or more positive complexity factors that increase the value of the entity. The one or more instructions may cause the one or more processors to generate one or more action items based on the complexity factors. The one or more action items may relate to positively impacting the value of the entity by removing a negative complexity factor of the one or more negative complexity factors or adding one or more additional positive complexity factors. The one or more instructions may cause the one or more processors to perform, by the analytics system, an action associated with the one or more action items to positively impact the value of the entity.

According to some possible implementations, a method may include receiving, by a computing device, a plurality of data items related to an entity to be analyzed. The method may include storing, by the computing device, the plurality of data items using a storage device based on receiving the plurality of data items. The method may include analyzing, by the computing device, the plurality of data items to identify complexity factors related to the entity based on storing the plurality of data items. The complexity factors may positively impact the entity or negatively impact the entity. The method may include generating, by the computing device, a set of action items associated with modifying operations of the entity to impact the complexity factors related to the entity. The set of action items may be associated with positively impacting the entity. The method may include performing, by the computing device, a set of actions based on the set of action items to positively impact the entity.

BRIEF DESCRIPTION OF THE DRAWINGS

FIG. 4 is a flow chart of an example process for automatically analyzing complexity of an entity and performing an action based on the entity;

DETAILED DESCRIPTION

The following detailed description of example implementations refers to the accompanying drawings. The same reference numbers in different drawings may identify the same or similar elements.

Analysis of a process may be used to improve the process (e.g., to improve efficiency, value, etc.). For example, the process may have positive and/or negative value inputs that can be described in terms of complexity or simplicity (e.g., a quantity of inputs, a type of inputs, a dependency of an input on another input, etc.). The process may have a positive or negative value output or outcome that can be impacted by the positive and/or negative value inputs and/or the complexity or simplicity of the positive and/or negative value inputs. In some cases, and by way of example, an entity (e.g., a business, an organization, etc.) may be described in terms of one or more processes that can be analyzed (e.g., one or more processes that relate to providing goods/services, processing transactions, etc.).

Implementations described herein provide an analytics system which may perform automatic analysis of data items to identify complexity factors or simplicity factors related to a process (e.g., activities, systems, goods, services, etc., that impact efficiency, value, etc., of the process). Furthermore, the analytics system may perform automatic determination of how the complexity factors or the simplicity factors affect the process, and/or automatic generation of action items based on the analysis.

In this way, the analytics system increases an efficiency of analyzing a process, thereby conserving processing resources. Furthermore, the analytics system improves an accuracy of determining how complexity factors or simplicity factors affect the process and/or the manner in which an individual and/or a device interacts with the process or a system related to the process, thereby conserving processing resources related to inaccurate analysis. Moreover, the analytics system improves an efficiency of performing an action based on a result of analyzing the process, thereby conserving processing resources.

Figure 1A:
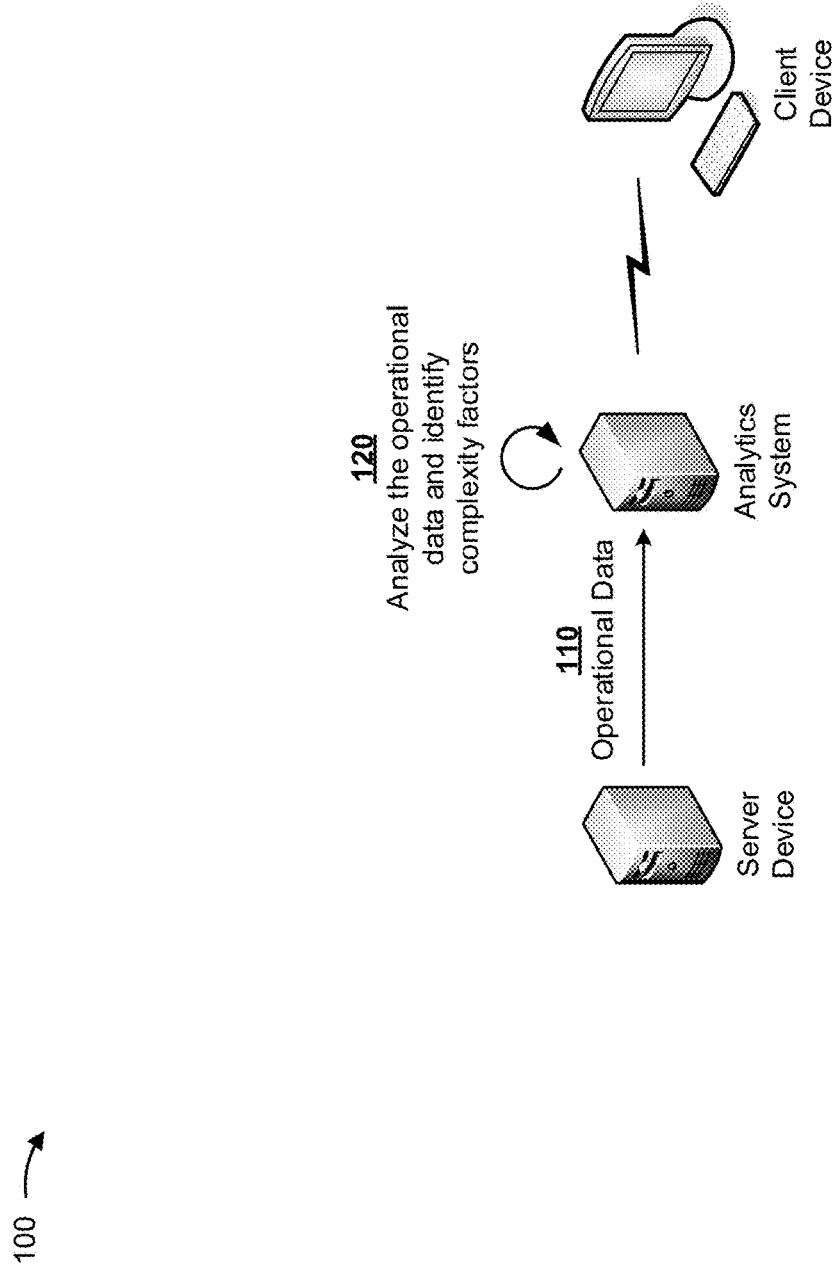
FIGS. 1A and 1B are diagrams of an overview of an example implementation described herein.
Figure 1B:
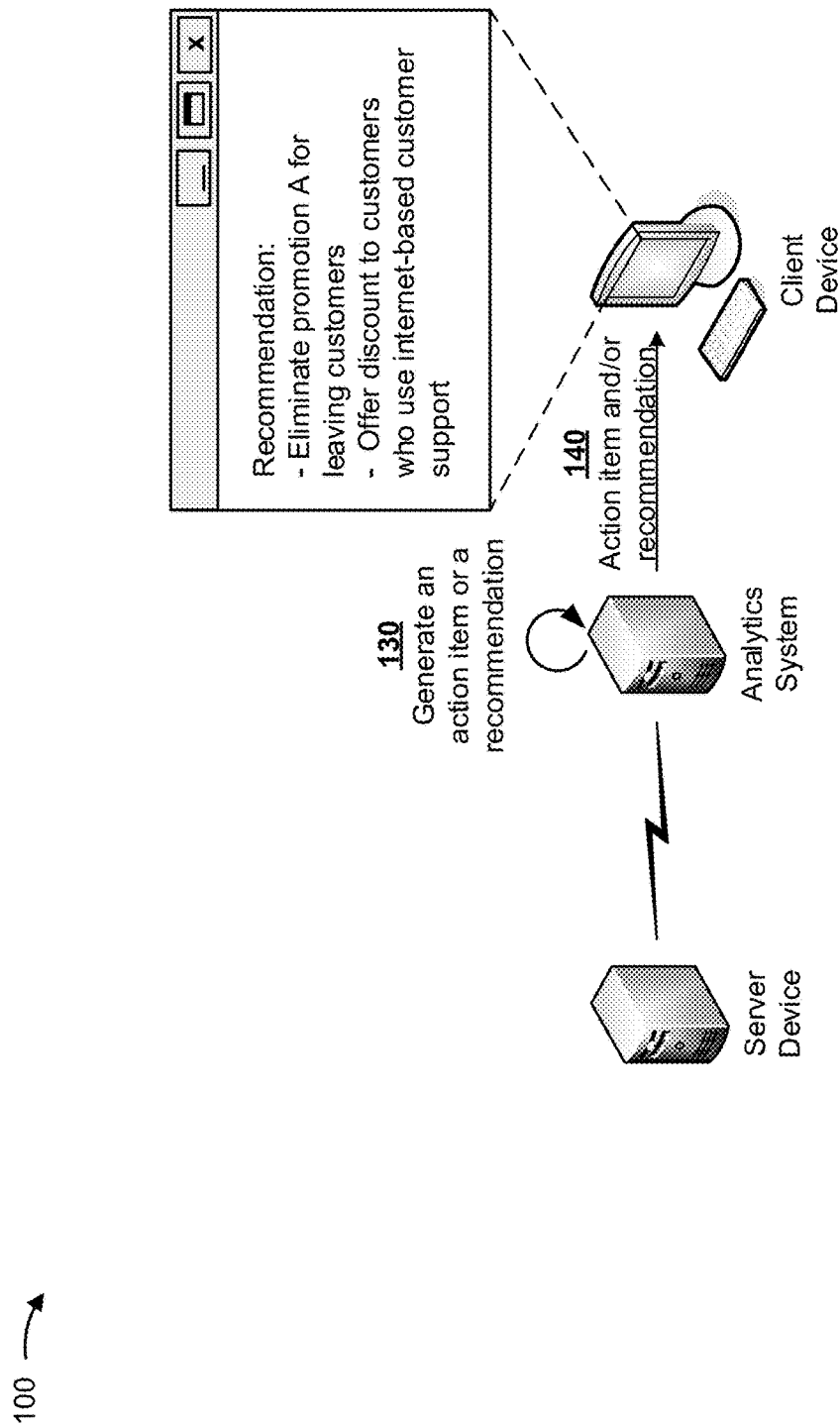

FIGS. 1A and 1B are diagrams of an overview of an example implementation 100 described herein. As shown in FIG. 1A, example implementation 100 may include an analytics system, a server device, and a client device. As shown by reference number 110, the analytics system may receive a data item (e.g., operational data) from the server device. The data item may include entity data related to operations of an entity, customer data related to customer interactions with the entity (e.g., purchasing a good from the entity or consuming services related to the good), or the like. In some cases, the analytics system may receive millions or billions of data items related to the entity. As shown by reference number 120, the analytics system may analyze the data item and identify complexity factors related to operation of the entity (e.g., using a big data analytics technique, tool, software, or application). For example, the complexity factors may relate to processes, goods, services, customers, or systems of the entity, or the like.

As shown in FIG. 1B, and as shown by reference number 130, the analytics system may generate an action item and/or a recommendation based on the complexity factors. For example, the analytics system may generate a recommendation to eliminate a particular promotion or to offer incentives to customers to use a particular service channel for customer service-related services. As shown by reference number 140, the analytics system may provide the action item and/or the recommendation to the client device for display (e.g., via a display of the client device). In some cases, as described in more detail below, the analytics system may automatically perform an action based on the action item and/or the recommendation.

In this way, the analytics system increases an efficiency of analyzing operations of an entity, thereby conserving processing resources. Furthermore, the analytics system improves an accuracy of determining how complexity factors affect the operations of the entity and/or the manner in which an individual interacts with the entity, thereby conserving processing resources related to inaccurate analysis. Moreover, the analytics system improves an efficiency of performing an action based on a result of analyzing the operations of the entity, thereby conserving processing resources.

As indicated above, FIGS. 1A and 1B are provided merely as an example. Other examples, are possible and may differ from what was described with regard to FIGS. 1A and 1B.

For example, although implementations in FIGS. 1A and 1B were described in terms of an entity, the implementations can be described in terms of a process, where the analytics system analyzes inputs of a process that have a positive or negative value and are associated with various complexity factors or simplicity factors. In addition, although described in terms of analyzing complexity, or complexity factors, the implementations may be described in terms of analyzing simplicity, or simplicity factors. Simplicity, or simplicity factors, may be described as the opposite or inverse of complexity, or complexity factors, where an item that increases complexity may decrease simplicity and an item that decreases complexity may increase simplicity.

Figure 2:
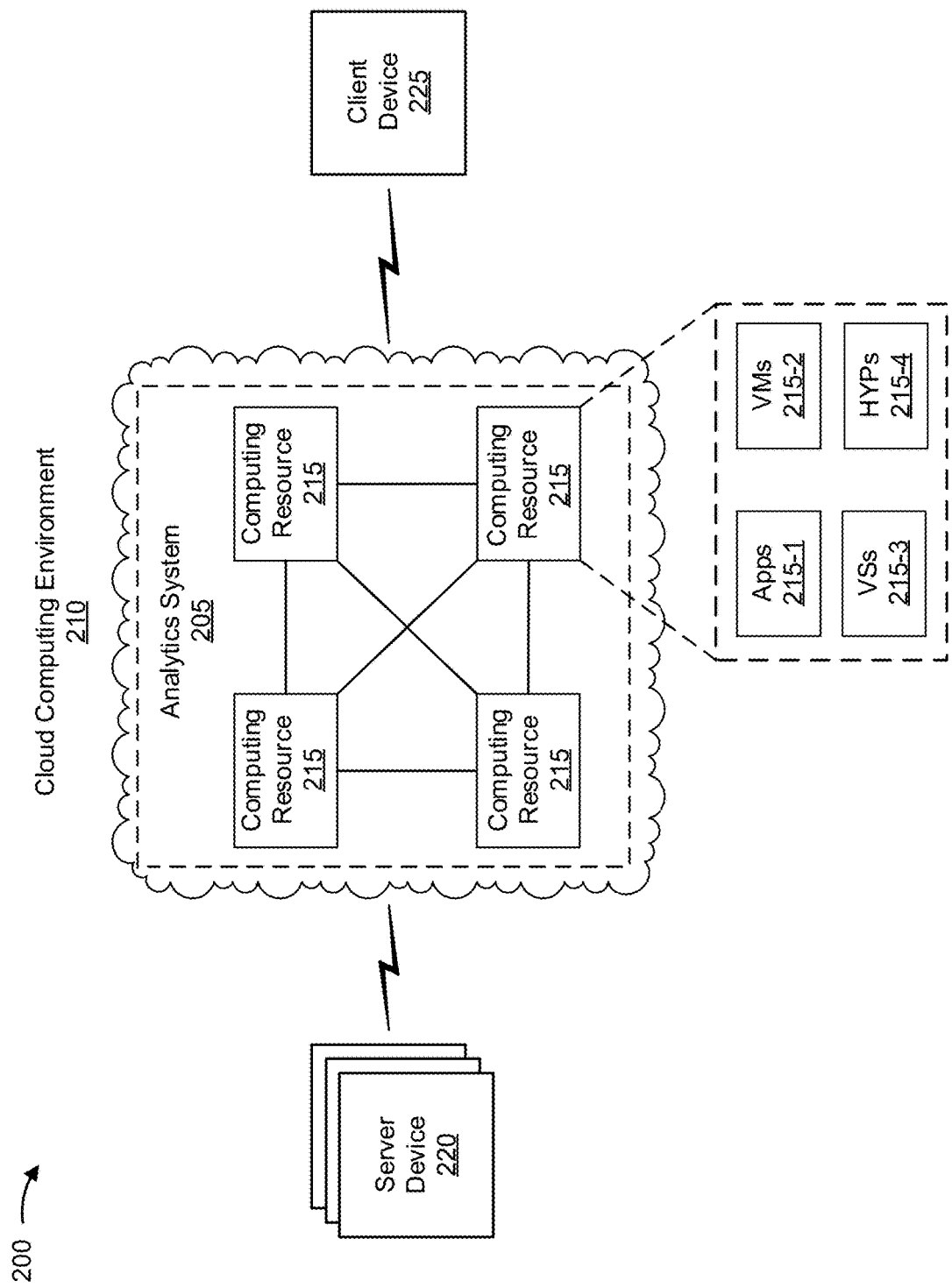
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include an analytics system 205, a cloud computing environment 210, a set of computing resources 215, one or more server devices 220 (referred to collectively as "server devices 220," and individually as "server device 220"), and a client device 225. Devices of environment 200 may interconnect via wired connections, wireless connections, or a combination of wired and wireless connections.

Analytics system 205 includes one or more devices capable of obtaining data to be processed, analyzing the data, providing, for display, a result of analyzing the data, and/or automatically performing an action based on the result of analyzing the data, as described elsewhere herein. For example, analytics system 205 may include a cloud server or a group of cloud servers. In some implementations, analytics system 205 may be designed to be modular such that certain software components can be swapped in or out depending on a particular need. As such, analytics system 205 may be easily and/or quickly reconfigured for different uses.

In some implementations, as shown, analytics system 205 may be hosted in cloud computing environment 210. Notably, while implementations described herein describe analytics system 205 as being hosted in cloud computing environment 210, in some implementations, analytics system 205 may not be cloud-based (i.e., may be implemented outside of a cloud computing environment) or may be partially cloud-based.

Cloud computing environment 210 includes an environment that hosts analytics system 205. Cloud computing environment 210 may provide computation, software, data access, storage, etc. services that do not require end-user knowledge of a physical location and configuration of system(s) and/or device(s) that host analytics system 205. As shown, cloud computing environment 210 may include a group of computing resources 215 (referred to collectively as "computing resources 215" and individually as "computing resource 215").

Computing resource 215 includes one or more personal computers, workstation computers, server devices, or other types of computation and/or communication devices. In some implementations, computing resource 215 may host analytics system 205. The cloud resources may include compute instances executing in computing resource 215, storage devices provided in computing resource 215, data transfer devices provided by computing resource 215, etc. In some implementations, computing resource 215 may communicate with other computing resources 215 via wired connections, wireless connections, or a combination of wired and wireless connections.

As further shown in FIG. 2, computing resource 215 includes a group of cloud resources, such as one or more applications ("APPs") 215-1, one or more virtual machines ("VMs") 215-2, one or more virtualized storages ("VSs") 215-3, or one or more hypervisors ("HYPs") 215-4.

Application 215-1 includes one or more software applications that may be provided to or accessed by one or more devices of environment 200. Application 215-1 may eliminate a need to install and execute the software applications on devices of environment 200. For example, application 215-1 may include software associated with analytics system 205 and/or any other software capable of being provided via cloud computing environment 210. In some implementations, one application 215-1 may send/receive information to/from one or more other applications 215-1, via virtual machine 215-2.

Virtual machine 215-2 includes a software implementation of a machine (e.g., a computer) that executes programs like a physical machine. Virtual machine 215-2 may be either a system virtual machine or a process virtual machine, depending upon use and degree of correspondence to any real machine by virtual machine 215-2. A system virtual machine may provide a complete system platform that supports execution of a complete operating system ("OS"). A process virtual machine may execute a single program, and may support a single process. In some implementations, virtual machine 215-2 may execute on behalf of a user (e.g., client device 225), and may manage infrastructure of cloud computing environment 210, such as data management, synchronization, or long-duration data transfers.

Virtualized storage 215-3 includes one or more storage systems and/or one or more devices that use virtualization techniques within the storage systems or devices of computing resource 215. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 215-4 provides hardware virtualization techniques that allow multiple operating systems (e.g., "guest operating systems") to execute concurrently on a host computer, such as computing resource 215. Hypervisor 215-4 may present a virtual operating platform to the guest operating systems, and may manage the execution of the guest operating systems. Multiple instances of a variety of operating systems may share virtualized hardware resources.

Server device 220 includes one or more devices capable of storing, processing, and/or routing information associated with operations of an entity. For example, server device 220 may include a server (e.g., in a data center or a cloud computing environment), a data center (e.g., a multi-server micro data center), a workstation computer, a virtual machine (VM) provided in a cloud computing environment, or a similar type of device. In some implementations, server device 220 may include a communication interface that allows server device 220 to receive information from and/or transmit information to other devices in environment 200. In some implementations, server device 220 may gather information associated with operations of an entity, such as from a point-of-sale system, an electronic commerce system, an organizational support system, or the like, as described elsewhere herein. Additionally, or alternatively, server device 220 may provide the information to analytics system 205, as described elsewhere herein.

Client device 225 includes one or more devices capable of receiving, generating, storing, processing, and/or providing information associated with operations of an entity. For example, client device 225 may include a communication and/or computing device, such as a desktop computer, a laptop computer, a tablet computer, a server device, a mobile phone (e.g., a smart phone or a radiotelephone), a wearable communication device (e.g., a smart wristwatch, an activity band, or a pair of smart eyeglasses), a gaming device, or a similar type of device. In some implementations, client device 225 may receive a result of an analysis by analytics system 205 and/or may receive a recommendation generated by analytics system 205, as described elsewhere herein. Additionally, or alternatively, client device 225 may provide the result and/or the recommendation for display (e.g., via a display of client device 225), as described elsewhere herein.

The number and arrangement of devices and networks shown in FIG. 2 are provided as an example. In practice, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
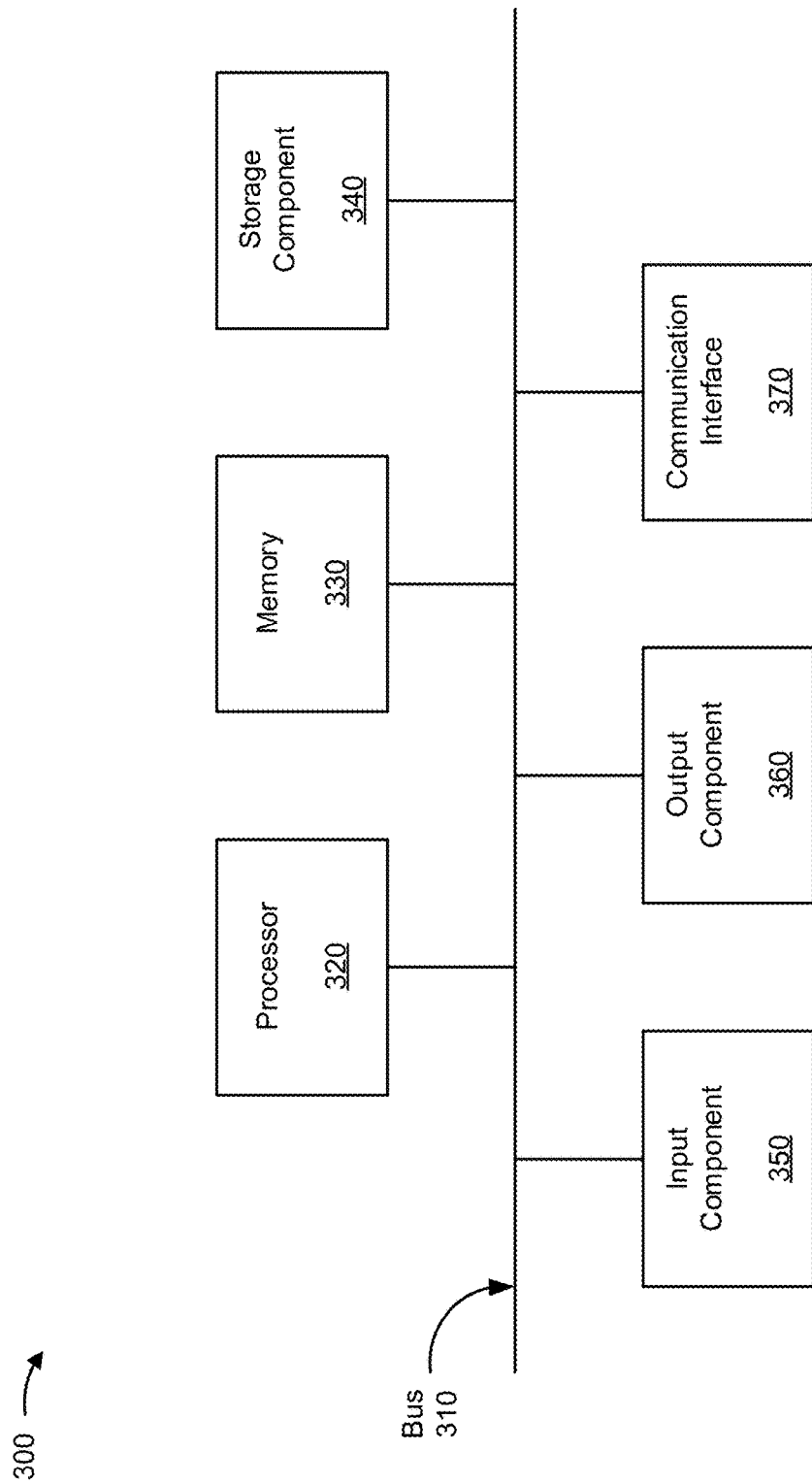
FIG. 3 is a diagram of example components of one or more devices of FIG. 2.

FIG. 3 is a diagram of example components of a device 300. Device 300 may correspond to analytics system 205, cloud computing environment 210, a set of computing resources 215, server devices 220, and client device 225. In some implementations, analytics system 205, cloud computing environment 210, a set of computing resources 215, server devices 220, and client device 225 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a processor (e.g., a central processing unit (CPU), a graphics processing unit (GPU), and/or an accelerated processing unit (APU)), a microprocessor, a microcontroller, and/or any processing component (e.g., a field-programmable gate array (FPGA) and/or an application-specific integrated circuit (ASIC)) that interprets and/or executes instructions. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for automatically analyzing complexity of an entity and performing an action based on the complexity. In some implementations, one or more process blocks of FIG. 4 may be performed by analytics system 205. In some implementations, one or more process blocks of FIG. 4 may be performed by another device or a group of devices separate from or including analytics system 205, such as cloud computing environment 210, a set of computing resources 215, server device 220, and/or client device 225.

As shown in FIG. 4, process 400 may include receiving a data item relating to operation of an entity (block 410), and storing the data item in a storage device (block 420). For example, analytics system 205 may receive millions or billions of data items relating to operation of an entity and may store the data items in a storage device. A data item may include information that includes values for properties of an entity at a particular time. An entity may include a private organization, a government organization, and/or the like. In some implementations, analytics system 205 may receive the data item from server device 220 (e.g., periodically, according to a schedule, based on requesting the data item, etc.).

In some implementations, the data item may relate to operation of an entity. As one example, a data item may include data related to the operation of the entity, the data being referred to hereinafter as entity data. In some implementations, entity data may include data related to a quantity or type of good/service channels of the entity (e.g., online channel, retail channel, call center channel, delivery channel, etc.). Additionally, or alternatively, entity data may include data related to value expended in association with providing goods/services. Additionally, or alternatively, entity data may include data related to types of goods/services offered by the entity (e.g., stock keeping unit (SKU) information, such as a SKU number). Additionally, or alternatively, entity data may include data related to tiers of goods/services (e.g., a basic tier, a premium tier, etc.). Additionally, or alternatively, entity data may include data related to a type and/or a quantity of support services related to goods/services offered by the entity (e.g., customer support services, repair/replacement services, good/service representative services, etc.). Additionally, or alternatively, entity data may include data related to promotional offers, rebates, and/or discounts provided by the entity, or the like.

As another example, a data item may include data related to individuals, referred to hereinafter as individual data. In some implementations, individual data may include data related to individual interactions with the entity, such as customer support history and/or channels used by the individual (e.g., a customer, a client, an individual interacting with the entity, etc.), such as online, in-person, or self-serve channels. Additionally, or alternatively, individual data may include data related to transactions by the individual (e.g., purchases of goods/services, returns of goods/services, repairs, discounts or rebates received, etc.). Additionally, or alternatively, individual data may include data related to a value of the transactions by the individual (e.g., a dollar amount, a time value, etc.). Additionally, or alternatively, individual data may include data related to demographics of the individual (e.g., income, geographic location, age, gender, etc.).

In some implementations, the term transaction may refer broadly to an interaction that an individual has with an entity. For example, a transaction may include a transaction that involves an exchange of value for a good/service, such as sale of a good/service. As another example, a transaction may include a transaction that does not include an exchange of value for a good/service, such as when an individual receives a good/service from a government entity. As another example, a transaction may include a page view of a website and/or an advertisement relating to the entity, click-through activity, hovering activity relating to a website and/or an advertisement relating to the entity, and/or other similar types of activities.

In some implementations, analytics system 205 may receive the data item from server device 220 associated with a system of the entity. For example, analytics system 205 may receive the data item from server device 220 associated with a point-of-sale system, an electronic commerce system, a billing system, an accounting system, an advertising system, and/or the like. Additionally, or alternatively analytics system 205 may receive the data item directly from the system (e.g., rather than receiving the data item from server device 220). In this way, analytics system 205 improves an efficiency of receiving the data item by enabling analytics system 205 to receive the data items more quickly (e.g., relative to receiving the data item from server device 220).

In some implementations, analytics system 205 may store the data item. For example, analytics system 205 may store the data item using a data structure and/or memory resources of analytics system 205, such as in virtual storage 215-3. In some implementations, analytics system 205 may aggregate multiple data items. For example, analytics system 205 may aggregate multiple data items by aggregating the multiple data items into a database, data structure, and/or the like. This conserves processing resources by permitting quick and efficient access to the multiple data items. In addition, this permits processing and/or scalability that may not be possible using un-aggregated data, or that may consume significant processing resources when using un-aggregated data. Additionally, or alternatively, analytics system 205 may de-duplicate data items, merge sets of data items, normalize data items, and/or the like. In this way, analytics system 205 conserves memory resources of analytics system 205, and/or conserves processing resources by enabling analytics system 205 to quickly access data items.

In some implementations, analytics system 205 may aggregate different types of data items. For example, analytics system 205 may aggregate entity data and individual data. In some implementations, analytics system 205 may aggregate data items based on a particular attribute of the data items. For example, analytics system 205 may aggregate individual data by individual (e.g., using an individual identifier). As another example, analytics system 205 may aggregate entity data by good or service (e.g., using a good identifier or a service identifier). In this way, analytics system 205 may analyze data items based on one or more attributes of the data items (e.g., based on individual, good/service, demographic, transaction, etc.).

Additionally, or alternatively, analytics system 205 may aggregate data items associated with different file types. For example, analytics system 205 may aggregate data items associated with an excel file type, a text file type, a comma-separated values (CSV) file type, or the like. In some implementations, analytics system 205 may format data items associated with different file types prior to, or in association with, aggregating the data items associated with the different file types. For example, analytics system 205 may apply standard spacing to the data items, add or remove characters from the data items, separate a single column of data items into multiple columns of data items, etc.

In some implementations, analytics system 205 may aggregate and/or merge sets of data items using a big data analytics technique, tool, application, and/or software. For example, analytics system 205 may aggregate or merge millions or billions of data items. In some implementations, using big data analytics may enable analytics system 205 to aggregate and/or merge sets of data items to identify previously unidentifiable relationships and/or trends among the data items. For example, using big data analytics may enable analytics system 205 to merge and/or aggregate data items to identify/track a manner in which a complexity of an organization affects a positive or negative value of the entity.

Continuing with the previous example, using big data analytics may enable analytics system 205 to identify/track a manner in which the complexity of the entity affects a positive or negative value of individual customers of the entity (e.g., including positive or negative values related to providing discounts/rebates to individual customers, providing product support services to individual customers, or the like, not merely positive and negative values associated with producing and selling a good/service). This improves an accuracy of analyzing the data items by enabling analytics system 205 to identify/track relationships among the data items. In addition, this enable analytics system 205 to quickly and efficiently analyze a large quantity of data items, thereby conserving processing resources related to analyzing the data items.

In some implementations, analytics system 205 may process the data item. For example, analytics system 205 may process data items to associate a data item with another data item. As a particular example, analytics system 205 may process data items to associate a value expended (e.g., for delivery, for customer support, for repair/replacement, etc. related to a good/service) and a transaction, a good/service, or an individual, such as by averaging a total value expended across multiple transactions, using transaction or individual identifiers to map the value expended to the transaction, and/or the like.

In some implementations, analytics system 205 may determine whether a data item is corrupted or whether a data item is missing from a set of data items. In this case, when analytics system 205 determines that the data item is corrupted or that a data item is missing from a set of data items, analytics system 205 may receive a replacement data item to replace the missing or corrupted data item. For example, analytics system 205 may receive the replacement data item based on information related to the missing or corrupted data item, based on querying server device 220 for the missing or corrupted data item, based on cross-referencing data items to determine the missing or corrupted data item, based on a user input to client device 225, or the like.

As further shown in FIG. 4, process 400 may include analyzing the data item to identify a complexity factor relating to the operation of the entity (block 430). For example, analytics system 205 may analyze the data item to identify a complexity factor relating to the operation of the entity. A complexity factor may include a factor that relates to activities, systems, processes, goods, services, individuals, etc., or a combination thereof, which impact the entity (e.g., efficiency of the entity, a positive/negative value of the entity, etc.). For example, a complexity factor may include an amount of good/service customization (e.g., including price customization) offered by the entity, a quantity/type of promotions, discounts, or rebates offered to individuals, a quantity/type of channels available for interacting with the entity, or the like.

In some implementations, a complexity factor may include an item of positive complexity that positively impacts the company. A positive impact or outcome may refer to an impact/outcome that achieves or helps to achieve a desired outcome or result. For example, a complexity factor may include an item of positive complexity that increases efficiency (e.g., by reducing time between order and delivery, reducing a quantity of entity departments involved in a transaction, etc.), increases a positive value (e.g., profitability, revenue, etc.) of the entity, decreases a negative value (e.g., unprofitability, costs, etc.) of the entity, or the like. As specific examples, an item of positive complexity may include reducing a quantity of individual complaints, increasing incentive programs (e.g., directed toward positive value goods, services, channels, etc.), and/or the like.

In some implementations, a complexity factor may include an item of negative complexity that negatively impacts the company. A negative impact or outcome may refer to an impact/outcome that achieves or helps to achieve an undesired outcome or result. For example, a complexity factor may include an item of negative complexity that increases inefficiency (e.g., increases staff count, causes exceeding a threshold quantity of SKU numbers with infrequent purchases by individuals, such as a quantity of purchases that do not satisfy a threshold, etc.), increases a value expended (e.g., expenditures related to customer support, processing returns for purchased goods/services, etc.), or the like. As specific examples, an item of negative complexity may include exceeding a threshold amount of customer churn in a time period, an inventory of goods growing faster than sales of the goods, exceeding a threshold amount of lead time, increasing a quantity of production errors, exceeding a threshold quantity of meetings among employees of the entity in a period of time, increasing loss-leader pricing for goods/services, exceeding a threshold amount of customized pricing, and/or the like.

In some implementations, analytics system 205 may identify a complexity factor by determining whether a data item is related to a transaction. For example, analytics system 205 may identify a quantity/type of channels of the entity as a complexity factor when individuals use the channels to purchase a good/service, obtain a refund for a good/service, request services related a good/service received, or engage in any other type of transaction with the entity. In some implementations, when identifying the complexity factor, analytics system 205 may map data items. For example, analytics system 205 may map data items related to particular operations of an entity, such as a value of customer support operations, good/service delivery operations, customer acquisition/retention operations, and a transaction, such as an initial sale of a good/service where customer support services are later needed, an individual, such as an individual that interacts with the entity via the particular operations, and/or the like. In some implementations, analytics system 205 may map the data items using identifiers that are common across the data items, such as a transaction identifier that identifies a transaction or an individual identifier that identifies an individual. This conserves processing resources by enabling analytics system 205 to quickly and efficiently analyze relationships among data items In some implementations, analytics system 205 may allocate a value to a complexity factor. For example, analytics system 205 may allocate a value of a transaction to a complexity factor (e.g., based on mapping data items). In some implementations, analytics system 205 may determine whether the complexity factor is associated with a positive value (e.g., positively impacts the operation of the entity) or a negative value (e.g., negatively impacts the operation of the entity). For example, analytics system 205 may determine that the complexity factor is associated with the positive value or the negative value based whether a total value of values allocated to the complexity factor is positive or negative.

In some implementations, analytics system 205 may analyze data items to identify complexity factors related to individual demographics. For example, analytics system 205 may organize individuals by demographic category using data items identifying individual demographics and may analyze data items to determine whether customers in a particular age group, income level, geographic region, etc., are associated with a positive value or negative value for the entity (e.g., by allocating values of transactions to the customers). In some implementations, analytics system 205 may analyze data items using individual data and/or entity data related to transactions. For example, analytics system 205 may analyze data items related to a value received (e.g., revenue) from sales of goods/services to individuals, a value expended for providing customer support services to individuals for transactions, a value related (e.g., expended or lost) to discounts or rebates received by the individuals, and/or the like, such as by using information that identifies individuals, individual demographics, and/or transactions related to the individuals.

In some implementations, analytics system 205 may map complexity factors related to individual demographics and data items related to transactions. For example, analytics system 205 may map the complexity factors related to the individual demographics and the data items related to the transactions to determine a value associated with the individual demographics (e.g., to determine whether the customer demographics positively or negatively impact the operation of the entity). This conserves processing resources by enabling analytics system 205 to quickly and efficiently analyze the data items. In some implementations, analytics system 205 may analyze the data items using a statistical or modeling technique to predict which individual demographics may be associated with a positive value or a negative value, to identify a positive or negative trend related to a value associated with an individual demographic, etc.

In some implementations, analytics system 205 may generate a result based on identifying complexity factors related to individual demographics. For example, analytics system 205 may identify demographics that are associated with a positive or negative value. As another example, analytics system 205 may identify individual demographics that are associated with using particular channels (e.g., retail or online channels) and whether or not use of those channels is associated with a positive value or a negative value.

In some implementations, analytics system 205 may analyze data items to identify complexity factors related to entity channels. For example, analytics system 205 may track individual transactions via different channels to determine whether particular channels provide more positive value for the entity relative to other channels. For example, more positive value may be achieved when a particular channel achieves a desired objective or helps to achieve a desired objective relative to one or more other channels. As another example, analytics system 205 may analyze data items using individual data and/or entity data related to transactions (e.g., a value expended per transaction for each channel, transactions for each individual via each channel, etc.). In some implementations, when analyzing the data items to identify complexity factors related to entity channels, analytics system 205 may map the data items. For example, analytics system 205 may map data items related to a value of transactions via each of the entity channels, such as to determine an average per transaction value for each channel, an average per individual value for each channel, and/or a relationship between each channel of the entity and a value of transactions related to each channel. This conserves processing resources by enabling analytics system 205 to quickly and efficiently analyze the data items.

In some implementations, analytics system 205 may determine a value expended (e.g., a cost) for each individual based on total value expended for transactions for different channels. Additionally, or alternatively, analytics system 205 may determine a combination of channels that minimizes a value expended per individual or per transaction. For example, analytics system 205 may determine that a combination (e.g., of an online channel for an initial sale of goods/services, a self-installation channel for delivery of the goods/services, an online channel for payment for the goods/services, and a kiosk channel for delivering support services related to the goods/services) minimizes a value expended per individual or transaction (e.g., relative to another combination, such as a retail channel for the initial sale, a professional installation for delivery, a retail channel for payment, and a call center channel for delivering support services).

In some implementations, analytics system 205 may aggregate data items related to usage of different channels. For example, analytics system 205 may aggregate data items related to usage of different channels to determine which channels are used by a threshold quantity or percentage of individuals, which channels are used by a highest quantity or percentage of individuals (e.g., relative to other channels), and/or the like. In some implementations, analytics system 205 may use this information to identify underutilized channels, such as channels that are used by a quantity of individuals that does not satisfy a threshold, channels that are associated with a negative value despite being used by a threshold quantity of individuals, and/or the like.

In some implementations, analytics system 205 may generate a result based on identifying complexity factors related to entity channels. For example, analytics system 205 may determine that a threshold quantity or percentage of transactions occur via channels other than the channel with the lowest value per individual or transaction (e.g., relative to other channels), determine that a threshold quantity or percentage of individuals use multiple channels for the same interaction (e.g., use multiple channels to receive customer support services for a sale of goods/services), and/or the like. In this case, analytics system 205 may combine the result with other data items, such as individual demographics (e.g., to determine whether a threshold percentage of individuals with a particular individual demographic use a particular channel).

In some implementations, analytics system 205 may analyze the data items to identify complexity factors related to a positive or negative value of a good/service. In this case, analytics system 205 may use data items related to individual transactions organized by good, service, or a good/service tier. For example, analytics system 205 may use data items related to value received from a sale of goods/services, data items related to value expended on providing customer support services for the goods/services, or the like. Continuing with the previous example, analytics system 205 may use identifiers that identify a particular individual, a particular transaction, etc. to analyze the data items to identify complexity factors that are related to a positive or negative value of a good/service.

In some implementations, when analyzing the data items to identify complexity factors related to a positive or negative value of a good/service, analytics system 205 may map data items. For example, analytics system 205 may map data items identifying values of transactions related to the good/service and data items identifying the good/service, such as by using an identifier that links the good/service and the transaction. This conserves processing resources by enabling analytics system to quickly and efficiently analyze the data items.

In some implementations, analytics system 205 may generate a result based on identifying complexity factors related to the positive value or negative value of the good/service. For example, when generating the result, analytics system 205 may determine whether combinations of goods, services, and/or good/service tiers are purchased by positive value individuals or negative value individuals. In this case, analytics system 205 may determine a positive or negative value for a particular good, service, and/or good/service tier considering a positive or negative value expended for customer support services related to the particular good, service, and/or good/service tier, a positive or negative value of benefits provided to individuals that purchase particular goods, services, and/or good/service tiers (e.g., complimentary support services provided to a premium tier, complimentary goods/services included in a bundle of goods/services, etc.).

In some implementations, analytics system 205 may analyze the data items to identify complexity factors related to an organization and/or structure of the entity. For example, when analyzing the data items to identify complexity factors related to an organization and/or structure of the entity, analytics system 205 may use data items related to a quantity of, or particular, employees and/or departments of the entity associated with completing a sale of a particular good/service or another transaction. As another example, analytics system 205 may use data items related to identifying a quantity of departments via which a transaction is processed (e.g., to identify bottlenecks that introduce lag time), a value expended related to each department, tasks performed by different departments and/or employees, or the like.

In some implementations, when analyzing the data items to identify complexity factors related to an organization and/or structure of the entity, analytics system 205 may map data items. For example, analytics system 205 may map data items related to departments or employees and data items that identify a value of transactions associated with the departments or employees (e.g., to determine whether the organization and/or structure of the entity is associated with a positive value or a negative value). In some implementations, analytics system 205 may determine whether the complexity factors related to an organization and/or structure of the entity are associated with a positive value or a negative value. For example, analytics system 205 may determine whether the complexity factors related to an organization and/or structure of the entity are associated with a positive value or a negative value based on mapping data items that indicate a value of a transaction and the complexity factors. This conserves processing resources by enabling analytics system 205 to quickly and efficiently analyze data items.

In some implementations, analytics system 205 may generate a result based on identifying complexity factors related to organization and/or structure of the entity. For example, analytics system 205 may identify aspects of the organizational structure that are reducing positive value for a transaction, such as identifying a threshold quantity of employees that are involved in a sale of goods/services, identifying a threshold quantity of departments via which a transaction is processed, identifying departments and/or employees that are performing similar tasks for a transaction, and/or the like.

In some implementations, analytics system 205 may analyze the data items to identify complexity factors related to a strategy of the entity. For example, analytics system 205 may use data items related to a strategy of the entity, such as a strategy to expand a particular channel of the entity, to target a particular individual demographic, to increase offerings of goods, services, and/or good/service tiers, or the like.

In some implementations, analytics system 205 may receive a document (e.g., a text document) and may extract terms from the document relating to entity strategy to identify a strategy of the entity (e.g., by using natural language processing to parse the text document and identify terms related to entity strategy). Additionally, or alternatively, analytics system 205 may receive input that includes weights or scores for different goals or priorities of managers of the entity or operations of the entity, such as weights or scores received from an analytic hierarchy process. In some implementations, analytics system 205 may use the extracted terms and/or the scores/weights to identify complexity factors related to a strategy of the entity. For example, analytics system 205 may match terms extracted from the text document and data items received from server device 220 (e.g., using tags or terms included in the data items) to identify data items related to the strategy of the entity.

In some implementations, analytics system 205 may use data items related to a value of goods, services, and/or good/service tiers, a value of channels, a value expended related to expanding channels, and/or the like to analyze the data items to identify complexity factors related to the strategy of the entity. For example, analytics system 205 may map the complexity factors identified from the data items and the value of transactions related to the complexity factors to determine whether the complexity factors related to a strategy of the entity positively or negatively impact the entity. This conserves processing resources by enabling analytics system 205 to quickly and efficiently analyze the data items.

In some implementations, analytics system 205 may generate a result of identifying complexity factors related to the strategy of the entity. In this case, analytics system 205 may generate a result based on comparing terms related to a strategy of the entity extracted from the document and data items related to a value of operations the entity. For example, the result may identify a strategy preference for processing transactions via a retail channel, rather than an online channel (e.g., to provide a more personal service to individuals) and may further identify that individuals who use a retail channel, rather than an online channel are associated with a negative value or negatively impact the operation of the entity, which may indicate a misalignment between a strategy of the entity and a value associated with the strategy.

As another example, the result may identify a strategy preference for customized pricing (e.g., to provide more flexibility to individuals) and may further identify that customized pricing is associated with a negative value or negatively impacts operations of the entity. As another example, the result may identify a strategy preference for having retail channels near particular individuals (e.g., individuals with particular demographics) and may identify that having the retail channels causes the particular individuals to be associated with a negative value or that individuals with the particular individual demographic are associated with a negative value, thereby negatively impacting operations of the entity.

In some implementations, analytics system 205 may analyze the data items to identify complexity factors related to a value associated with offers, promotions, rebates, or the like. For example, analytics system 205 may use data items representing a value received for transactions associated with an offer and data items representing a value expended for the transactions. As a particular example, analytics system 205 may analyze the data items to determine whether a sale of a good/service associated with a promotion is associated with positive value by analyzing value expended for customer support, processing returns, etc., that are associated with the sale.

In some implementations, when analyzing the data items to identify complexity factors related to a value associated with offers, promotions, rebates, or the like, analytics system 205 may map data items. For example, analytics system 205 may map data items related to a promotion, goods/services, and/or good/service tiers associated with the promotion, a value of individuals that participated in the promotion, and/or a value of operations of the entity related to supporting the promotion, such as to determine whether a promotion positively or negatively impacts the operation of the entity (e.g., is associated with a positive or negative value). This enables analytics system 205 to quickly and efficiently analyze data items, thereby conserving processing resources.

In some implementations, analytics system 205 may generate a result of identifying complexity factors related to offers, promotions, rebates, or the like. For example, analytics system 205 may generate a result that identifies that a promotion is associated with increased value received for a good/service, but that subsequent value expended (e.g., due to providing customer support services, processing returns, etc.) causes the promotion to be associated with a negative value. As another example, analytics system 205 may generate a result that identifies that individuals that participate in a promotion tend to be associated with a negative value, thereby indicating that the promotion to negatively impacts operation of the entity.

In this way, analytics system 205 may quickly and efficiently analyze data items related to a complexity of an entity, thereby conserving processing resources related to analyzing the data items and/or reducing an amount of time needed to analyze the data items. In addition, this enables analytics system 205 to quickly analyze millions or billions of data items, such as to identify previously unknown relationships among data items. Further, this enables analytics system 205 to identify relationships among different types of data items, such as a relationship between a quantity of systems used by the entity or an amount of customized pricing that the entity offers and a positive or negative impact on the entity.

As further shown in FIG. 4, process 400 may include generating an action item based on the complexity factor (block 440). For example, analytics system 205 may generate an action item based on the complexity factor and/or whether the complexity factor is associated with a positive value (e.g., to increase items of positive complexity), or a negative value (e.g., to decrease or eliminate items of negative complexity). In some implementations, analytics system 205 may generate an action item or a recommendation based on the complexity factor and/or based on analyzing the data item.

In some implementations, analytics system 205 may generate an action item to modify operations of the entity. In this case, analytics system 205 may generate an action item to reduce or eliminate operations that have a negative value that satisfies a threshold, or to reduce or eliminate operations that have a positive value that does not satisfy a threshold. For example, analytics system 205 may generate an action item to reduce or eliminate negative value goods/services, reduce a quantity of channels, or eliminate a promotion that has a negative value. In this case, analytics system 205 may generate an action item to cease production of goods associated with a negative value, to reduce a range of hours in which services associated with a negative value will be available, or the like.

As another example, analytics system 205 may generate an action item related to modifying a strategy associated with a negative value or a strategy that does not satisfy a threshold positive value (e.g., retail channel strategy, target customer strategy, etc.). For example, analytics system 205 may generate an action item to alter an advertising strategy to no longer target a demographic of individuals associated with a negative value.

As another example, analytics system 205 may generate an action item related to reducing or eliminating negative value channels of the entity. For example, upon determining that retail payment is associated with a negative value, analytics system 205 may generate an action item to incentivize individuals to utilize online payment as an alternative to retail payment, such as through use of a promotion or discount.

As another example, analytics system 205 may generate an action item related to reducing or eliminating particular promotions. For example, analytics system 205 may generate an action item to eliminate promotions for a particular individual demographic (e.g., individuals that do not satisfy a particular annual income).

As another example, analytics system 205 may generate an action item related to generating an incentive for individuals to take particular action (e.g., use an online customer service channel that is associated with a higher positive value relative to other customer service channels). For example, where online customer service is associated with a positive value and call center customer service is associated with a negative value, analytics system 205 may generate an action item to offer free online customer service relative to a fee being charged for call center customer service, such as to incentivize individuals to use the online customer service.

As another example, analytics system 205 may generate an action item related to reducing a quantity of goods/services offered. For example, analytics system 205 may generate an action item to reduce production of a type of good associated with a positive value that does not satisfy a threshold or a type of good associated with a negative value.

In some implementations, action items may positively impact an overall complexity of the entity. For example, action items may reduce negative complexity. As a particular example, promoting online payment may reduce negative value associated with payments, and decrease negative value of the entity. As another example, action items may increase positive complexity. As a particular example, offering a discount to individuals in a particular demographic associated with a positive value may increase volume, and may thereby increase positive complexity of the entity.

In some implementations, analytics system 205 may associate multiple action items together, such as to generate a set of instructions or steps to perform, such as a set of instructions or steps related to modifying complexity or operation of the entity. For example, analytics system 205 may associate a first action item and a second action item associated with the same result of an analysis to generate a set of instructions.

In some implementations, analytics system 205 may identify an individual associated with the entity (e.g., an employee, director, etc.) and associate information identifying the individual with the action item (e.g., based on role description, responsibility description, etc. of the individual). For example, analytics system 205 may identify an individual to perform the action item based on processing a text document that describes duties and/or responsibilities of the individual to identify terms and associating those terms with terms and/or tags related to the action item.

In this way, analytics system 205 may quickly and efficiently generate an action item related to complexity of the entity, thereby conserving processing resources related to generating an action item. In addition, this reduces and amount of time needed to generate an action item related to complexity of the entity based on analyzing the complexity of the entity.

As further shown in FIG. 4, process 400 may include performing an action associated with the action item to positively impact an overall complexity of the operation of the entity (block 450). For example, analytics system 205 may perform an action associated with the action item to positively impact an overall complexity of the operation of the entity. In some implementations, the action may positively impact an overall complexity of the operation of the entity (e.g., by reducing or eliminating negative complexity factors and/or increasing positive complexity factors). In some implementations, when performing the action, analytics system 205 may modify operations of the entity or cause a modification of operations of the entity. For example, analytics system 205 may perform an action to cause modification of a quantity or combination of activities, systems, processes, goods, services, or target individuals (e.g., target customers) of the entity to positively impact the overall complexity of the entity.

As a particular example of performing an action, analytics system 205 may cancel or expand a promotion, discount, or offer (e.g., to reduce a quantity of promotions, to reduce or eliminate negative value promotions, etc.) by removing the promotion, discount, or offer from an electronic commerce system, a web site, and/or the like, such as when analytics system 205 determines that a positive or negative value associated with the promotion, discount, or offer satisfies a threshold. As another example, analytics system 205 may remove a good/service from an electronic commerce website (e.g., reduce a quantity or type of good/service sold by the entity) when the good/service is associated with a negative value, such as by removing or deleting information related to the good or service from server device 220.

As another example, analytics system 205 may modify a price of a good/service (e.g., based on an average positive value per sale of the good/service based on data items representing value received and data items representing value expended), such as by updating an electronic record or data structure that includes information identifying the good/service and a corresponding value of the good/service. As another example, analytics system 205 may eliminate professional installation of a software product where professional installation is associated with a negative value and self-installation is associated with a positive value, such as by removing professional installation as an option presented to individuals via an electronic commerce system.

In some implementations, analytics system 205 may generate a report. For example, analytics system 205 may generate a report that identifies the action item and/or a result of performing the action item (e.g., an amount or a percentage by which a positive value may increase or a negative value may decrease). As another example, analytics system 205 may generate a report that identifies complexity factors and/or whether the complexity factors are associated with a positive value or a negative value. In some implementations, analytics system 205 may provide the report for display (e.g., via a display of client device 225).

In some implementations, analytics system 205 may schedule a meeting related to the action item. For example, analytics system 205 may schedule a meeting among managers of the entity, such as meeting to discuss complexity factors, by using electronic calendars associated with the managers to identify an available time to meet.

In some implementations, analytics system 205 may send a message (e.g., a short message service (SMS) message, an email, etc.). For example, analytics system 205 may send, to a device, a message that includes instructions for performing the action item. As another example, analytics system 205 may send a message to another device to perform the action, such as a message to server device 220 to remove a good/service from a system or to remove a promotion from a system.

In this way, analytics system 205 may quickly and efficiently perform an action based on generating an action item related to complexity of an entity, thereby conserving processing resources. In addition, this reduces an amount of time needed to perform an action to impact complexity of the entity, thereby increasing an efficiency performing an action to impact complexity of the entity.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIGS. 5A-5E are diagrams of an example implementation 500 relating to example process 400 shown in FIG. 4. FIGS. 5A-5E show an example of automatically analyzing complexity of an entity and performing an action based on the entity. Specifically, FIGS. 5A-5E show an example of analyzing complexity related to customer characteristics or demographics and the manner in which the customer characteristics or demographics affect a value of an entity.

Figure 5A:
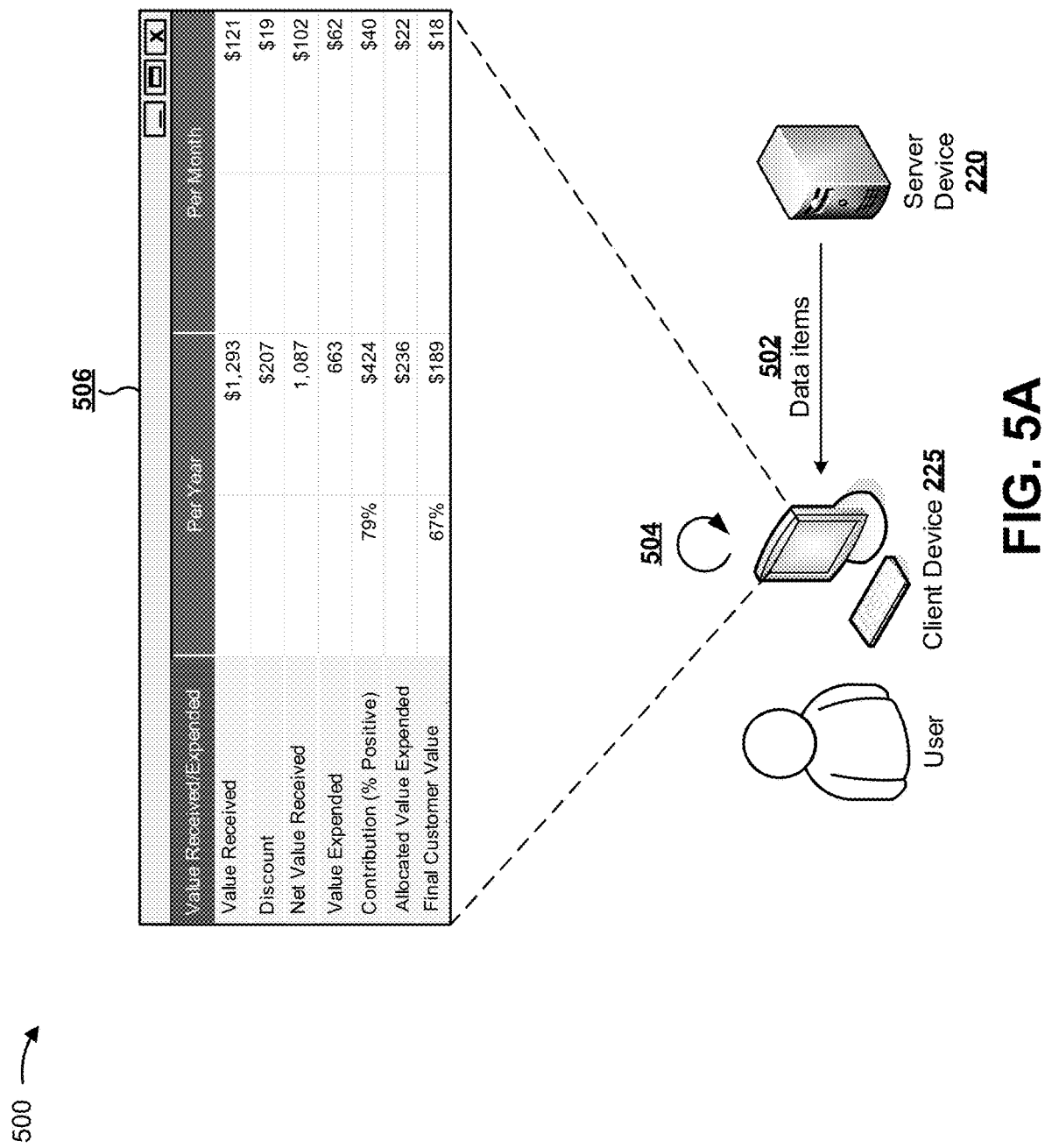
FIGS. 5A-5E are diagrams of an example implementation relating to the example process shown in FIG. 4.

As shown in FIG. 5A, example implementation 500 may include server device 220 and client device 225. In some implementations, server device 220 may store data items related to operations of an entity. In some implementations, client device 225 may host analytics system 205 and client device 225 may display information related to analyzing complexity, such as information received from analytics system 205. As shown by reference number 502, client device 225 may receive data items (e.g., from server device 220).

As shown by reference number 504, client device 225 may analyze the data items (e.g., using analytics system 205). For example, client device 225 may analyze the data items to allocate values received and values expended related to a good/service at a customer level (e.g., per individual customer), determine customer characteristics associated with a positive value or a negative value, and/or the like. In some implementations, client device 225 may use identifiers associated with the data items to map the data items. For example, client device 225 may map a transaction identifier associated with a value received or expended for a good/service to a customer associated with the same transaction identifier.

In some implementations, client device 225 may provide a result of the analysis for display. For example, as shown by reference number 506, client device 225 may display a data structure identifying a value received by the entity and value expended by the entity at a customer level. As further shown by reference number 506, for example, the data structure may show that a customer is associated with a final customer value of $189 dollars, indicating that the customer is associated with a positive value.

Figure 5B:
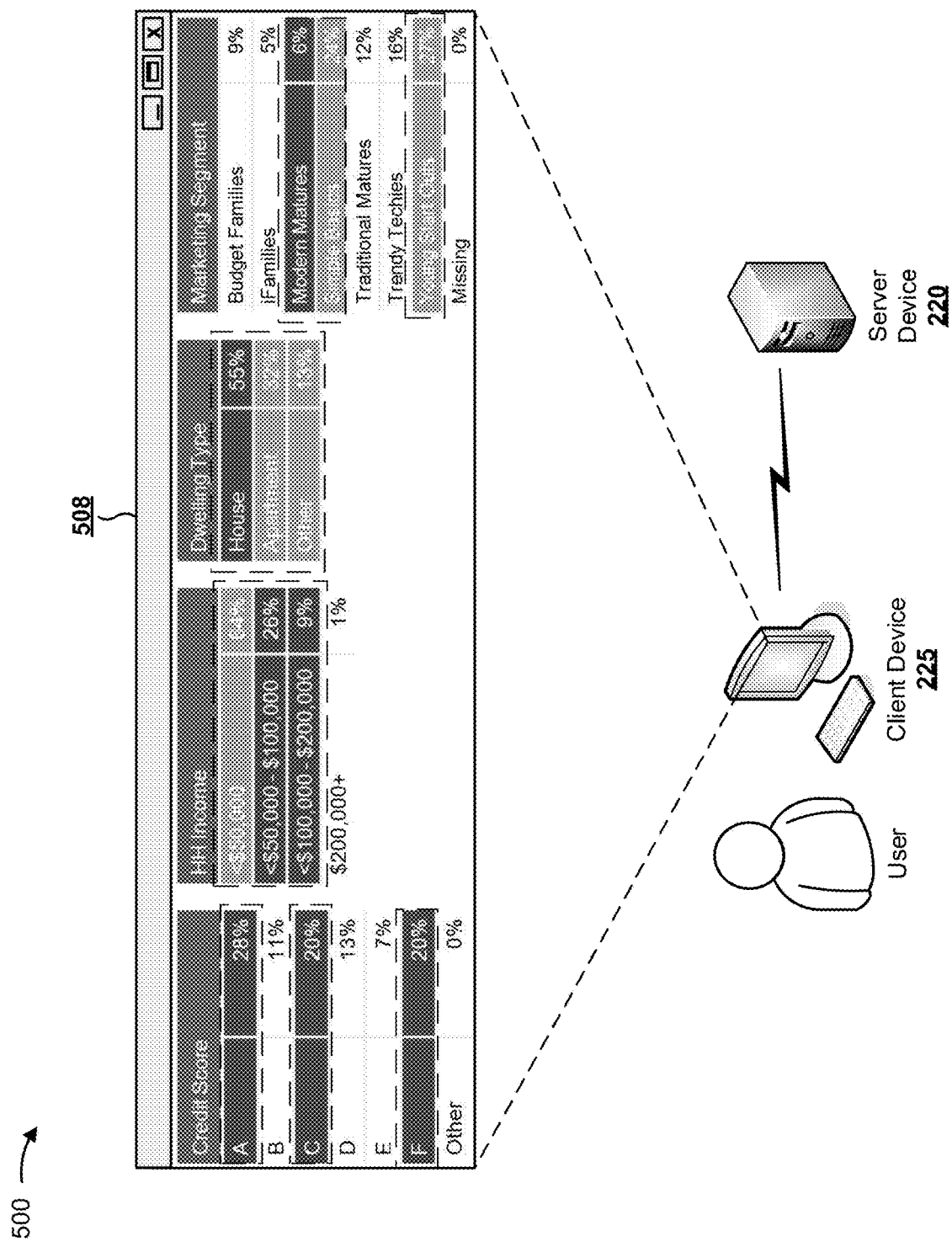

As shown in FIG. 5B, and as shown by reference number 508, client device 225 may display a table that shows whether or not particular customer characteristics are associated with a positive value. For example, customer characteristics may include credit score, household (HH) income, dwelling type, and/or marketing segment. In this case, fields that may identify negative value characteristics are shown as highlighted fields (e.g., highlighted with dashed boxes), and percentages shown may identify percentages of customers of the entity that have a corresponding characteristic.

Figure 5C:
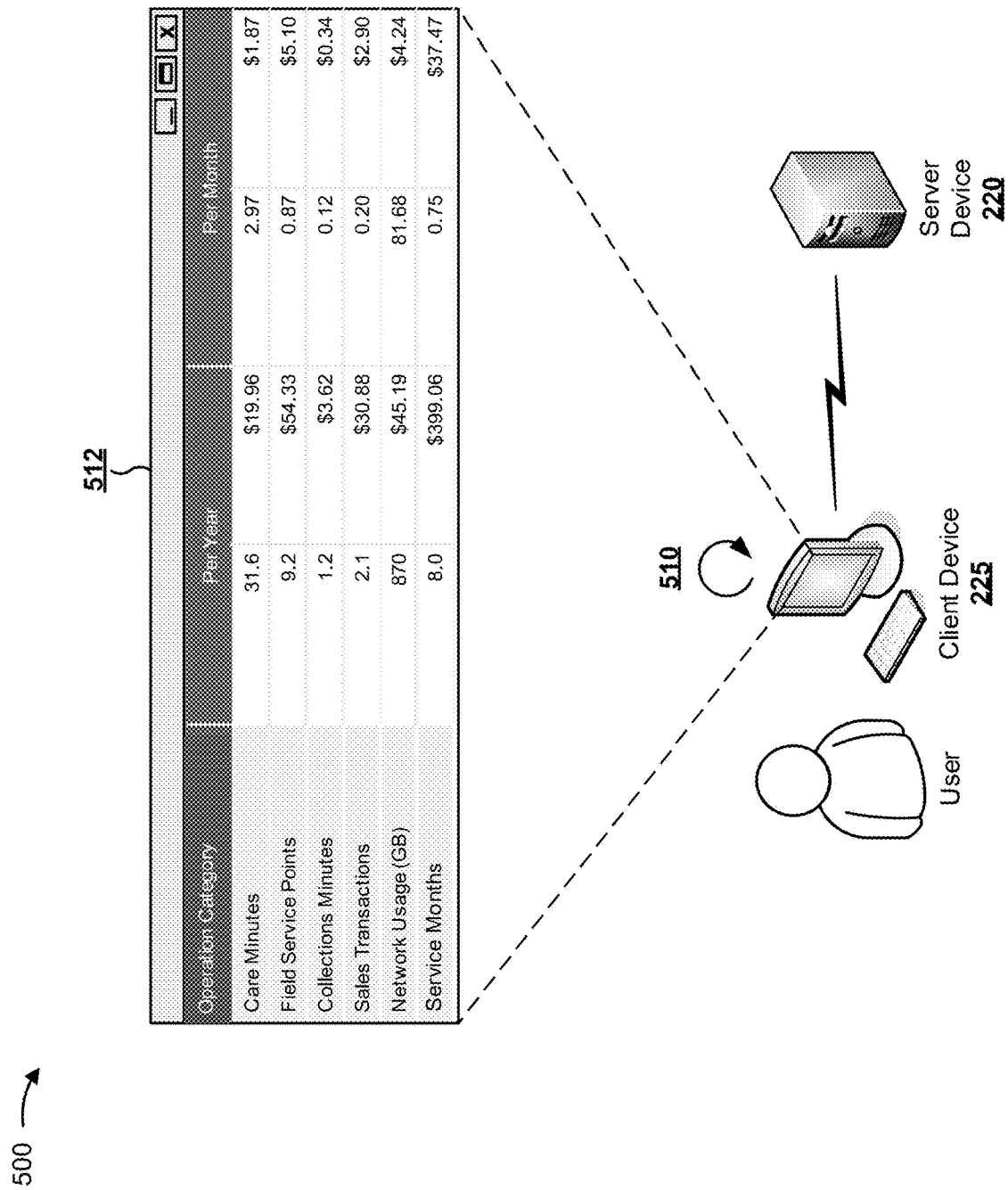

As shown in FIG. 5C, and as shown by reference number 510, client device 225 may determine information related to a baseline customer (e.g., an average customer). For example, client device 225 may determine the information for particular operation categories related to operations of the entity, such as customer care, field service by a technician, and/or the like. As shown by reference number 512, client device 225 may display the information for the baseline customer.

Figure 5D:
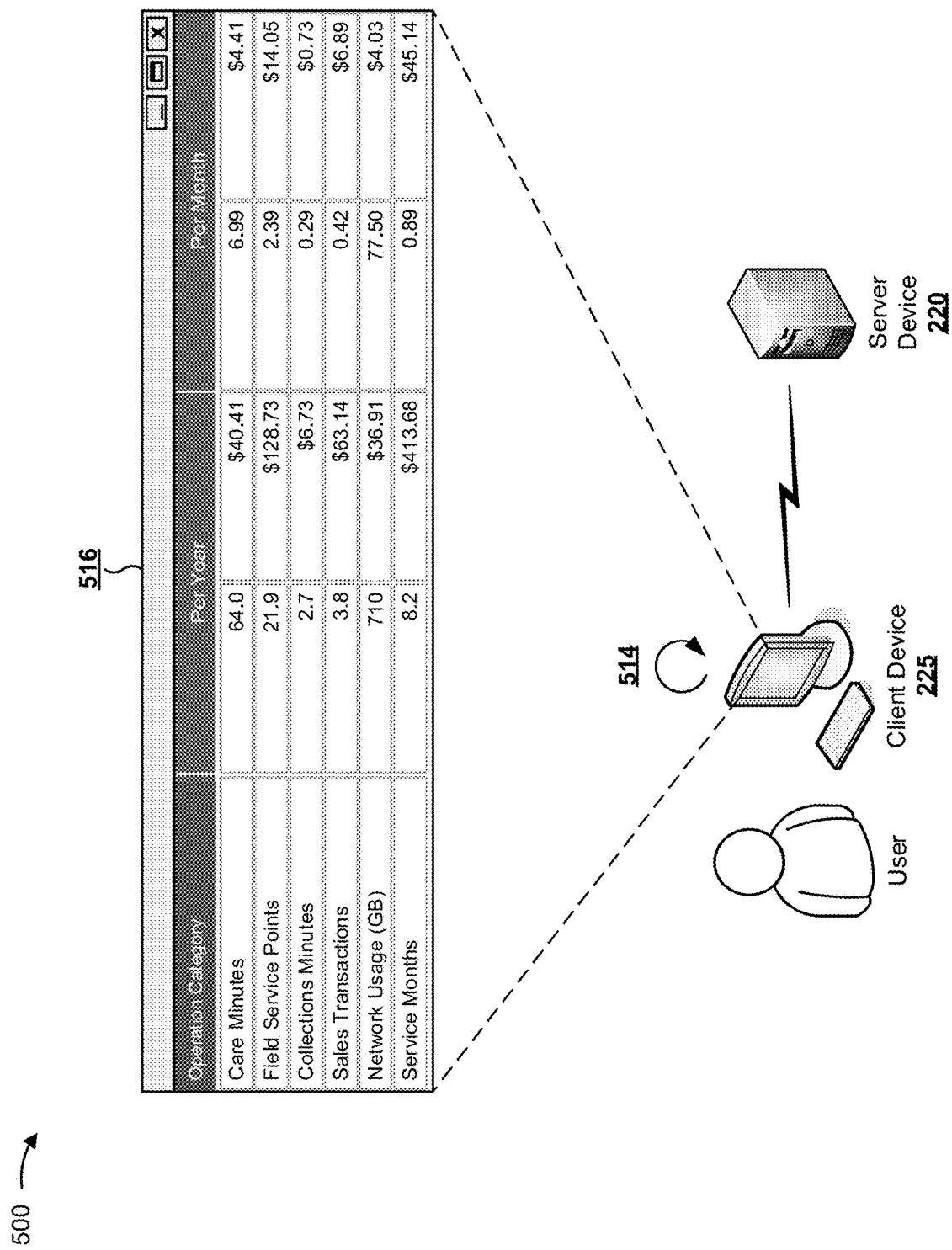

As shown in FIG. 5D, and as shown by reference number 514, client device 225 may determine information related to a set of customers, such as a set of customers with a particular characteristic. In some implementations, client device 225 may determine the information for the same operation categories as was determined for the baseline customer. As shown by reference number 516, client device 225 may provide, for display, the information associated with set of customers. In this case, client device 225 may compare the set of customers to the baseline customer (e.g., to determine whether customers are associated with a positive value or a negative value relative to the baseline customer). For example, client device 225 may determine that the set of customers is associated with a negative value for the operation categories of care minutes, field service points, collections minutes, and/or sales transactions based on the values for those operation categories having a greater value relative to the baseline customer.

Figure 5E:
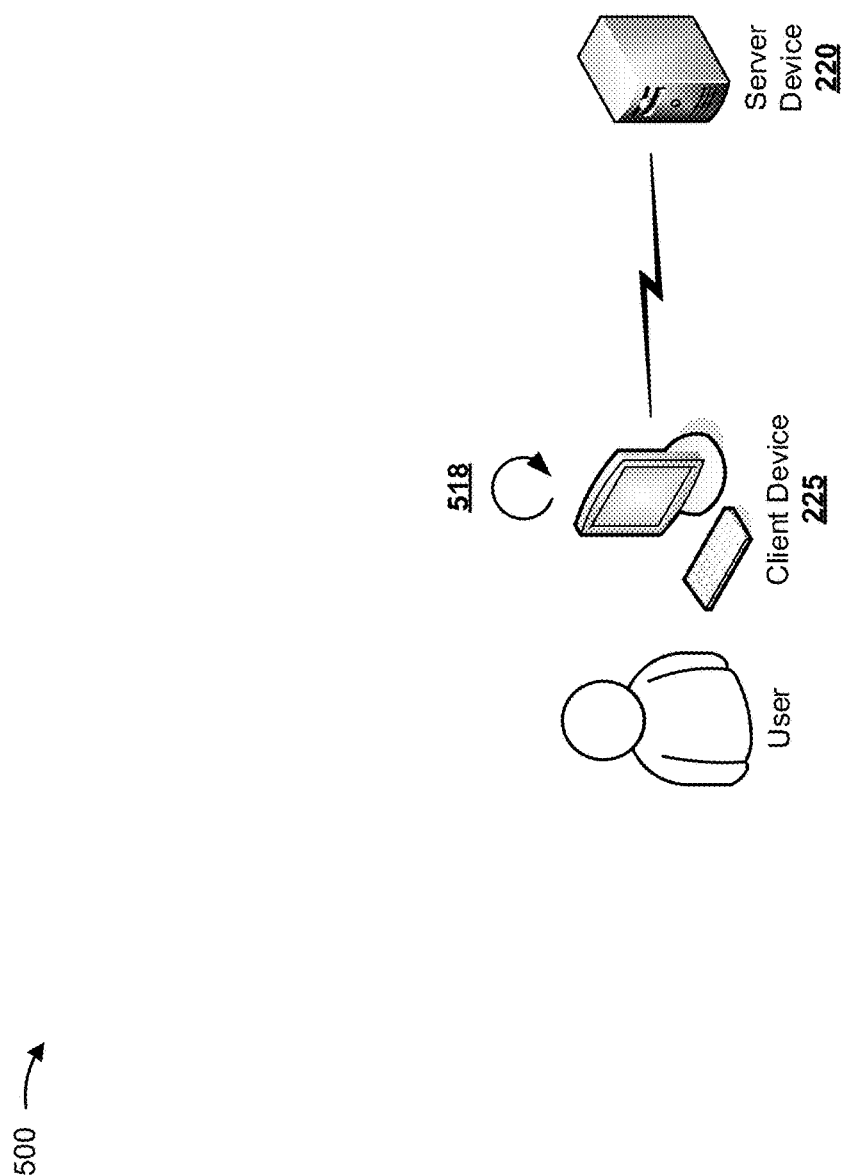

As shown in FIG. 5E, and as shown by reference number 518, client device 225 may generate an action item and/or perform an action based on analyzing the data items. For example, client device 225 may generate an action item to eliminate promotions and/or discounts made to customers in a modern matures marketing segment based on the modern matures marketing segment being associated with a negative value (e.g., as shown by reference number 508). As another example, client device 225 may automatically generate and send an SMS or an email message to an individual or department in the entity to effectuate elimination of the promotions and/or discounts.

In this way, client device 230, using analytics system 205, may analyze complexity of an entity related to customer characteristics of customers of the entity and may generate an action item and/or perform an action item based on the analysis.

As indicated above, FIGS. 5A-5E are provided merely as an example. Other examples are possible and may differ from what was described with regard to FIGS. 5A-5E.

FIGS. 6A-6D are diagrams of an example implementation 600 relating to example process 400 shown in FIG. 4. FIGS. 6A-6D show an example of automatically analyzing complexity of an entity and performing an action based on the entity. Specifically, FIGS. 6A-6D show an example of analyzing complexity related channels of the entity and the manner in which the combination of channels affects a value of an entity.

Figure 6A:
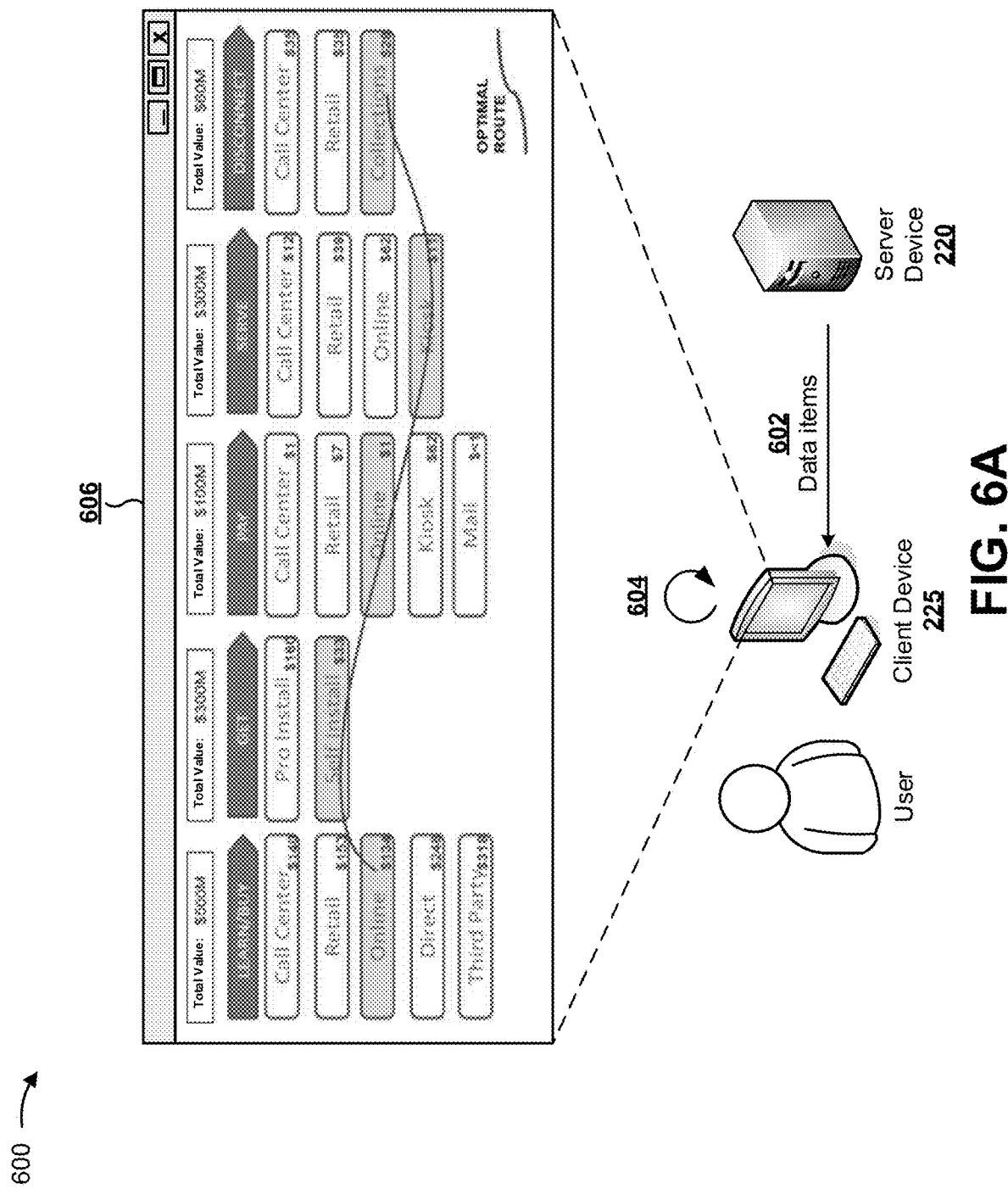
FIGS. 6A-6D are diagrams of an example implementation relating to the example process shown in FIG. 4.

As shown in FIG. 6A, example implementation 600 may include server device 220 and client device 225. In some implementations, server device 220 may store data items related to operations of an entity. In some implementations, client device 225 may host analytics system 205 and client device 225 may display information related to analyzing complexity, such as information received from analytics system 205. As shown by reference number 602, client device 225 may receive data items from server device 220.

As shown by reference number 604, client device 225 may analyze the data items. For example, client device 225 may analyze the data items to determine a value expended per transaction when a customer uses different channels. In this case, as shown by reference number 606, client device 225 may display information related to the channels of the entity. For example, client device 225 may display information related to a call center channel, a retail channel, an online channel, and/or the like. As another example, client device 225 may display information related to use of the channels for different transactions, such as purchasing a good/service, receiving the good/service, providing a value for the good/service (e.g., paying money for the good/service), and/or disconnecting the good/service.

In some implementations, client device 225 may determine a set of channels associated with a lowest value expended (or optimal route) for a customer to use, and may display an optimal route (e.g., set of channels) for a customer to use for different transactions, as indicated by the line shown. For example, as shown by reference number 606, client device 225 may determine that an optimal set of channels for a customer to use includes an online channel to place an order for a good/service (e.g., buy the good/service), a self-install channel, where the customer installs/initiates the good/service, an online channel to provide a value for the good/service, a kiosk channel to receive a good/service, such as a customer service, related to the good/service, and/or a collections channel to discontinue the service or return the good.

Figure 6B:
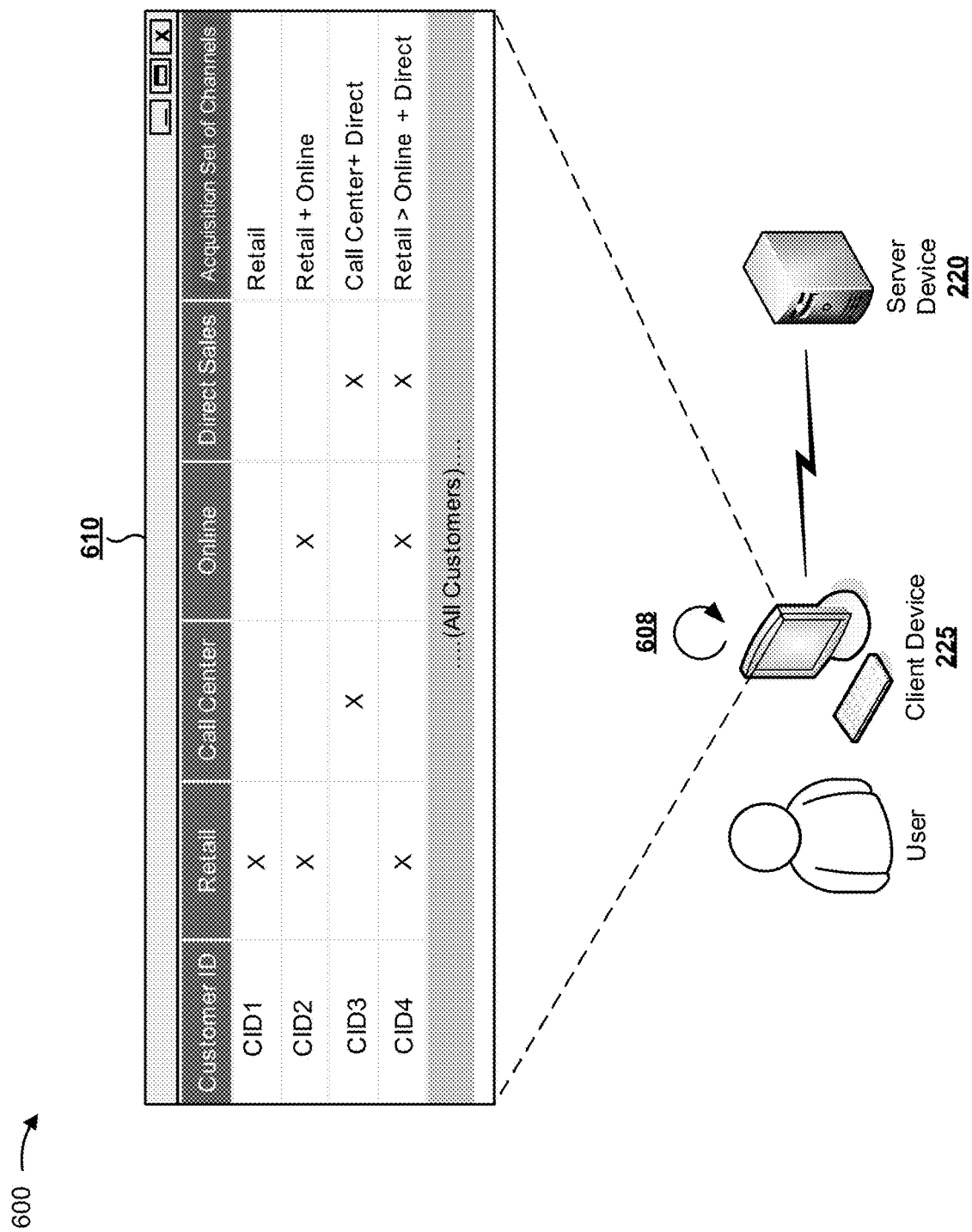

As shown in FIG. 6B, and as shown by reference number 608, client device 225 may determine channel information, such as channels used by each customer to acquire a good/service, and other data items related to channel use. As shown by reference number 610, client device 225 may provide the channel information for display.

Figure 6C:
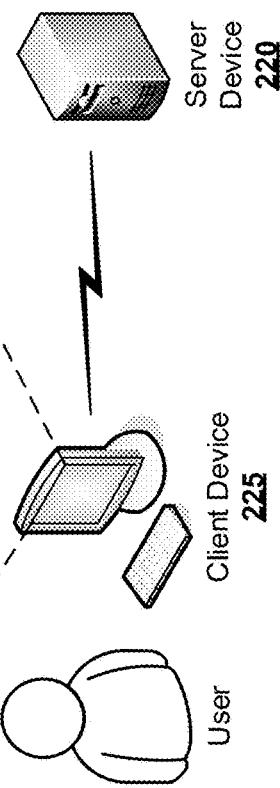

As shown in FIG. 6C, and as shown by reference number 612, client device 225 may display percentages of customers that use different combinations of channels to acquire a good/service, and may display an indication of value expended, such as a high value expended, a medium value expended, or a low value expended, by using the different combinations of channels (e.g., relative to other combinations, relative to a threshold, etc.). Additionally, or alternatively, client device 225 may display different quantities of channels and the percentage of customers that use the different quantities of channels.

Figure 6D:
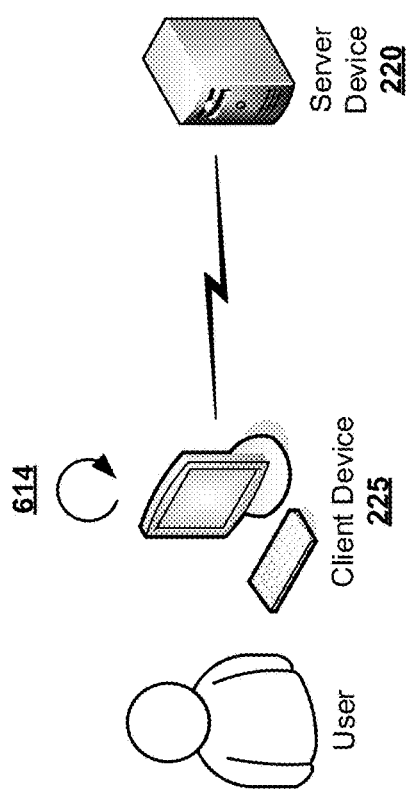

As shown in FIG. 6D, and as shown by reference number 614, client device 225 may generate an action item or a recommendation related to the analysis. For example, client device 225 may generate an action item to offer a discount to customers who use a direct and online (Direct+Online) channel combination, so as to encourage, or incentivize, use of alternatives to the direct and retail (Direct+Retail) channel combination, based on a value of the channel combinations. As another example, client device 225 may automatically schedule a meeting among individuals and/or departments based on the analysis, such as to discuss terms of the discount.

As indicated above, FIGS. 6A-6D are provided merely as an example. Other examples are possible and may differ from what was described with regard to FIGS. 6A-6D.

Implementations described herein provide an analytics system which may perform automatic analysis of data items to identify complexity factors related to the operation of an entity, automatic determination of how the complexity factors affect operations of the entity, and/or automatic generation of action items based on the analysis.

In this way, the analytics system increases an efficiency of analyzing operations of an entity, thereby conserving processing resources. Furthermore, the analytics system improves an accuracy of determining how complexity factors affect the operations of the entity and/or a manner in which an individual interacts with the entity, thereby conserving processing resources related to inaccurate analysis. Moreover, the analytics system improves an efficiency of performing an action based on a result of analyzing the operations of the entity, thereby conserving processing resources.

Implementations are described herein in terms of an entity merely as an example. The implementations may be described in terms of a process that has positive and/or negative value inputs associated with complexity factors and/or simplicity factors, rather than in terms of an entity. In addition, although implementations are described in terms of complexity and/or complexity factors, the implementations may be described in terms of simplicity and/or simplicity factors. For example, simplicity and/or simplicity factors may be described as the opposite or inverse of complexity and/or complexity factors, where an item that increases complexity would decrease simplicity, and an item that decreases complexity would increase simplicity.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   one or more processors to:
   obtain, by a computing device of a cloud computing environment, a plurality of data items relating to operation of an entity;
   store, by the computing device of the cloud computing environment, the plurality of data items in one or more storage devices associated with the cloud computing environment;
   merge, by the computing device of the cloud computing environment and using a first big data analytics technique, the plurality of data items based on file types associated with the plurality of data items, wherein merging includes formatting the plurality of data items;
   aggregate, by the computing device of the cloud computing environment and using a big data analytics technique, the plurality of data items based on particular attributes of the plurality of data items;
   determine, by the computing device of the cloud computing environment and after aggregating the plurality of data items, whether the plurality of data items can be mapped using an identifier associated with the plurality of data items based on obtaining the plurality of data items;
   analyze, by the computing device of the cloud computing environment and after storing the plurality of data items, the plurality of data items to identify a plurality of complexity factors relating to the operation of the entity,
   the plurality of complexity factors including:
   at least one item of negative complexity that negatively impacts the operation of the entity, and
   at least one item of positive complexity that positively impacts the operation of the entity;
   generate, by the computing device of the cloud computing environment, a plurality of action items based on the plurality of complexity factors,
   the plurality of action items to positively impact an overall complexity of the operation of the entity, and
   the plurality of action items including at least one action item associated with the at least one item of negative complexity to reduce an impact of the at least one item of negative complexity; and
   perform, by the computing device of the cloud computing environment, an action associated with one or more of the plurality of action items to positively impact the overall complexity of the operation of the entity.

2. The device of claim 1, where the one or more processors are further to:
   map the plurality of complexity factors to a value of a plurality of transactions associated with the plurality of complexity factors based on the identifier;
   determine whether the plurality of complexity factors are associated with a positive value or a negative value; and
   where the one or more processors, when generating the plurality of action items, are to:
   generate the plurality of action items based on determining whether the plurality of complexity factors are associated with the positive value or the negative value.

3. The device of claim 1, where the one or more processors, when analyzing the plurality of data items, are to:
   identify complexity factors of the plurality of complexity factors related to individual demographics of individuals associated with the entity; and
   where the one or more processors are further to:
   map the complexity factors and a value of a plurality of transactions associated with the individuals of the entity to determine whether the complexity factors are associated with a positive value or a negative value; and
   determine whether the complexity factors positively impact the operation of the entity or negatively impact the operation of the entity based on determining whether the complexity factors are associated with the positive value or the negative value.

4. The device of claim 3, where the one or more processors are further to:
allocate a set of values of a set of transactions to the individuals;
determine whether the set of values negatively impacts the entity or positively impacts the entity based on allocating the set of values; and
where the one or more processors, when generating the plurality of action items, are to:
generate the plurality of action items based on whether the set of values negatively impact the operation of the entity or positively impact the operation of the entity.

5. The device of claim 1, where the one or more processors, when analyzing the data items, are to:
identify complexity factors of the plurality of complexity factors related to a good or service provided by the entity; and
where the one or more processors are further to:
map the complexity factors and a value of a plurality of transactions associated with the good or service to determine whether the complexity factors are associated with a positive value or a negative value; and
where the one or more processors, when generating the plurality of action items, are to:
generate the plurality of action items based on determining whether the complexity factors are associated with the positive value or the negative value.

6. The device of claim 1, where the plurality of action items include at least one action to:
eliminate the at least one item of negative complexity, or add another item of positive complexity.

7. The device of claim 1, where the overall complexity includes a quantity or combination of activities, systems, processes, goods, services, or individual demographics of individuals associated with the entity.

8. A non-transitory computer-readable medium storing instructions, the instructions comprising:
one or more instructions that, when executed by one or more processors of an analytics system, cause the one or more processors to:
receive, from another device, multiple data items related to an entity;
store the multiple data items in a storage device associated with the analytics system based on receiving the multiple data items;
merge, using a first big data analytics technique, the multiple data items based on file types associated with the multiple data items,
wherein merging includes formatting the multiple data items;
aggregate, using a big data analytics technique, the multiple data items based on particular attributes of the multiple data items;
analyze, after aggregating the multiple data items, the multiple data items to identify one or more complexity factors related to the entity in association with storing the multiple data items,
the one or more complexity factors including:
one or more negative complexity factors that decrease a value of the entity, and
one or more positive complexity factors that increase the value of the entity;
generate one or more action items based on the complexity factors,
the one or more action items relating to positively impacting the value of the entity by removing a negative complexity factor of the one or more negative complexity factors or adding one or more additional positive complexity factors; and
perform, by the analytics system, an action associated with the one or more action items to positively impact the value of the entity.

9. The non-transitory computer-readable medium of claim 8, where the one or more instructions, when executed by the one or more processors, further cause the one or more processors to:
map first data items and second data items of the multiple data items to identify a relationship between the first data items and the second data items,
the first data items relating to usage of channels of the entity,
the second data items relating to values of transactions via the channels; and
where the one or more instructions, that cause the one or more processors to analyze the multiple data items, cause the one or more processors to:
analyze the multiple data items to identify the one or more complexity factors based on mapping the first data items and the second data items,
the one or more complexity factors relating to the channels of the entity.

10. The non-transitory computer-readable medium of claim 9, where the one or more instructions, that cause the one or more processors to generate the one or more action items, cause the one or more processors to:
generate an action item of the one or more action items related to the channels of the entity to:
eliminate a first channel of the channels associated with the one or more negative complexity factors, or
promote a second channel of the channels associated with the one or more positive complexity factors.

11. The non-transitory computer-readable medium of claim 8, where the one or more instructions, when executed by the one or more processors, further cause the one or more processors to:
map first data items and second data items of the multiple data items,
the first data items being related to an organization or structure of the entity,
the second data items being related to values expended during operation of the entity; and
where the one or more instructions, that cause the one or more processors to analyze the multiple data items, cause the one or more processors to:
analyze the multiple data items to identify complexity factors of the one or more complexity factors related to the organization of the entity based on mapping the first data items and the second data items.

12. The non-transitory computer-readable medium of claim 11, where the one or more instructions, when executed by the one or more processors, further cause the one or more processors to:
determine whether the complexity factors related to the organization of the entity decrease the value of the entity or increase the value of the entity; and
where the one or more instructions, that cause the one or more processors to generate the one or more action items, cause the one or more processors to:
generate the one or more action items based on determining whether the complexity factors related to the organization of the entity decrease the value of the entity or increase the value of the entity.

13. The non-transitory computer-readable medium of claim 8, where the one or more instructions, when executed by the one or more processors, further cause the one or more processors to:
   determine whether the multiple data items can be mapped based on a set of transactions related to the entity;
   map the multiple data items based on determining that the multiple data items can be mapped;
   allocate a set of values of the set of transactions to one or more data items of the multiple data items; and
   where the one or more instructions, that cause the one or more processors to analyze the multiple data items, further cause the one or more processors to:
      analyze the multiple data items to identify the one or more complexity factors based on allocating the set of values of the set of transactions to the one or more data items of the multiple data items.

14. The non-transitory computer-readable medium of claim 13, where the one or more instructions, that cause the one or more processors to analyze the one or more data items, further cause the one or more processors to:
   identify the one or more complexity factors based on the multiple data items being mapped to the set of transactions; and
   where the one or more instructions, when executed by the one or more processors, further cause the one or more processors to:
      determine whether the one or more complexity factors include:
         the one or more negative complexity factors based on the one or more data items being allocated a negative value, or
         the one or more positive complexity factors based on the one or more data items being allocated a positive value.

15. A method, comprising:
   receiving, by a computing device, a plurality of data items related to an entity to be analyzed;
   storing, by the computing device, the plurality of data items using a storage device based on receiving the plurality of data items;
   merging, by the computing device and using a first big data analytics technique, the plurality of data items based on file types associated with the plurality of data items,
      wherein merging includes formatting the plurality of data items;
   aggregating, by the computing device and using a big data analytics technique, the plurality of data items based on particular attributes of the plurality of data items;
   analyzing, by the computing device and after aggregating the plurality of data items, the plurality of data items to identify complexity factors related to the entity based on storing the plurality of data items,
      the complexity factors positively impacting the entity or negatively impacting the entity;
   generating, by the computing device, a set of action items associated with modifying operations of the entity to impact the complexity factors related to the entity,
      the set of action items being associated with positively impacting the entity; and
   performing, by the computing device, a set of actions based on the set of action items to positively impact the entity.

16. The method of claim 15, further comprising:
   receiving a document related to a strategy of the entity;
   processing the document to identify a set of terms related to the strategy of the entity based on receiving the document; and
   where analyzing the plurality of data items comprises:
      analyzing the plurality of data items to identify the complexity factors related to the strategy of the entity based on processing the document to identify the set of terms.

17. The method of claim 15, further comprising:
   determining whether the complexity factors related to a strategy of the entity are associated with a positive value or a negative value; and
   where generating the set of action items comprises:
      generating the set of action items to modify the operations of the entity based on determining whether the complexity factors related to the strategy of the entity are associated with the positive value or the negative value.

18. The method of claim 15, further comprising:
   mapping data items of the plurality of data items and a set of transactions,
      the data items being related to a set of promotions,
      the set of transactions being associated with the set of promotions; and
   identifying the complexity factors based on mapping the data items,
      the complexity factors being related to the set of promotions.

19. The method of claim 18, further comprising:
   allocating a value of the set of transactions to the complexity factors based on identifying the complexity factors;
   determining whether the value is a positive value or a negative value based on allocating the value of the set of transactions; and
   where generating the set of action items comprises:
      generating the set of action items based on whether the value is the positive value or the negative value,
         the set of action items being related to the set of promotions.

20. The method of claim 15, where performing the set of actions comprises:
   modifying a quantity or combination of activities, systems, processes, goods, services, or target individuals of the entity.

* * * * *